(12) United States Patent
Kurashina

(10) Patent No.: US 7,075,704 B2
(45) Date of Patent: Jul. 11, 2006

(54) TEST-ELEMENT-PROVIDED SUBSTRATE, METHOD OF MANUFACTURING THE SAME, SUBSTRATE FOR ELECTRO-OPTICAL DEVICE, ELECTRO-OPTICAL DEVICE, AND ELECTRONIC APPARATUS

(75) Inventor: Hisaki Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 10/751,971

(22) Filed: Jan. 7, 2004

(65) Prior Publication Data

US 2004/0184131 A1 Sep. 23, 2004

(30) Foreign Application Priority Data

Mar. 19, 2003  (JP) ........................................ 2003-076241
Oct. 10, 2003  (JP) ........................................ 2003-352678

(51) Int. Cl.
*G02F 1/00* (2006.01)
*G02F 1/1333* (2006.01)
*G02F 1/03* (2006.01)
*H01L 23/48* (2006.01)
*H01L 21/66* (2006.01)

(52) U.S. Cl. ........................ 359/321; 257/758; 349/158; 438/18; 359/245

(58) Field of Classification Search .................. 257/48, 257/758; 349/139, 147, 158; 359/245, 315, 359/321; 438/18, 29, 30
See application file for complete search history.

(56) References Cited

U.S. PATENT DOCUMENTS

| 5,982,470 | A | 11/1999 | Nakahara et al. |
| 6,144,085 | A | 11/2000 | Barker |
| 6,373,544 | B1 | 4/2002 | Hirabayashi |
| 6,373,546 | B1 | 4/2002 | Kim |
| 6,404,023 | B1 | 6/2002 | Mori et al. |
| 6,528,822 | B1 | 3/2003 | Murade |
| 6,614,500 | B1 | 9/2003 | Kim |
| 6,836,140 | B1 | 12/2004 | Fujikawa et al. |

FOREIGN PATENT DOCUMENTS

| JP | 05-226475 | 9/1993 |
| JP | A-06-194690 | 7/1994 |

(Continued)

*Primary Examiner*—David N. Spector
(74) *Attorney, Agent, or Firm*—Oliff & Berridge, PLC

(57) ABSTRACT

A plurality of film formation layers on which respective film formation patterns are formed; interlayer films formed among the plurality of film formation layers; test element patterns formed in test element formation regions with the same material as that of each film formation pattern of at least one film formation layer among the plurality of film formation layers; openings formed in the test element formation regions of an interlayer film of a planarized uppermost layer, thereby exposing a pair of pads connected to the test element patterns; and dummy patterns formed below the corresponding one of the pair of pads with the same material as that of each of the film formation patterns of predetermined film formation layers among the plurality of film formation layers, thereby defining the vertical locations of the pads and the contact holes, etc. in the test element formation regions.

21 Claims, 14 Drawing Sheets

FOREIGN PATENT DOCUMENTS

| | | |
|---|---|---|
| JP | 07-074175 | 3/1995 |
| JP | 07-092477 | 4/1995 |
| JP | A-08-190087 | 7/1996 |
| JP | A-09-068718 | 3/1997 |
| JP | A-09-162281 | 6/1997 |
| JP | 10-228026 | 8/1998 |
| JP | 11-72804 | 3/1999 |
| JP | A-2000-36599 | 2/2000 |
| JP | 2000-040827 | 2/2000 |
| JP | A-2000-081636 | 3/2000 |
| JP | A-2000-23113 | 8/2000 |
| JP | 2001-100647 | 4/2001 |
| JP | B2 3188411 | 5/2001 |
| JP | A-2001-196474 | 7/2001 |
| JP | 2001-308336 | 11/2001 |
| JP | 2001-337344 | 12/2001 |
| JP | 2001-343912 | 12/2001 |
| JP | A-2001-343912 | 12/2001 |
| JP | B2 3304298 | 5/2002 |
| JP | 2002-207223 | 7/2002 |

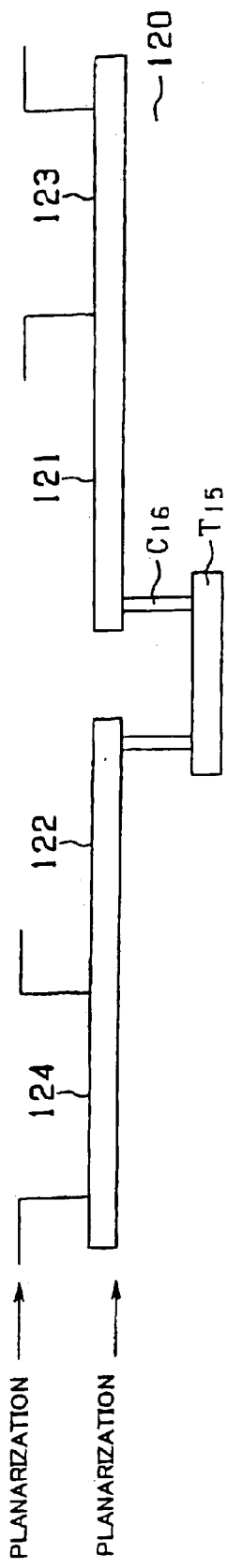
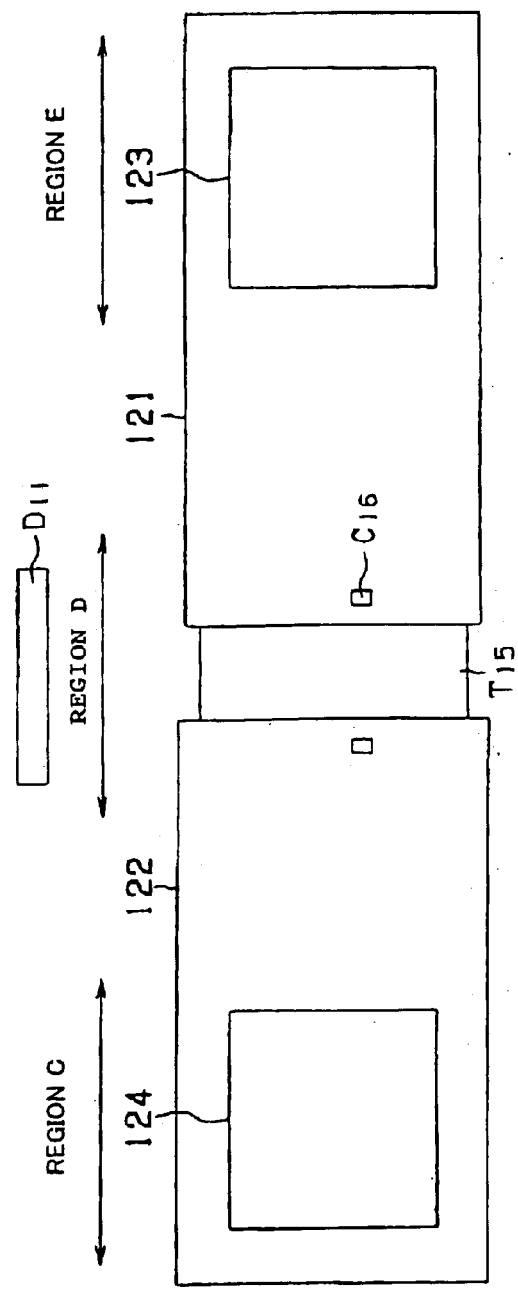
FIG. 11A
FIG. 11B

TEST-ELEMENT-PROVIDED SUBSTRATE, METHOD OF MANUFACTURING THE SAME, SUBSTRATE FOR ELECTRO-OPTICAL DEVICE, ELECTRO-OPTICAL DEVICE, AND ELECTRONIC APPARATUS

BACKGROUND OF THE INVENTION

1. Field of Invention

The present invention relates to a test-element-provided substrate suitable for a multi-layered substrate, particularly a TFT substrate, and a liquid crystal device, etc. using the substrate, a method of manufacturing the same, a substrate for an electro-optical device, an electro-optical device, and an electronic apparatus.

2. Description of Related Art

A liquid crystal device is constructed by sealing liquid crystal between two substrates which are made of glass substrates, quartz substrates, or the like. In the liquid crystal device, active elements, such as thin film transistors (hereinafter, "TFT") and pixel electrodes are disposed in a matrix shape on the one substrate, and counter electrodes (transparent electrodes (ITO (Indium Tin Oxide))) are disposed on the other substrate. The optical properties of the liquid crystal layer sealed between both substrates are changed in accordance with image signals, so that image display can be implemented.

In an electro-optical device, such as an active matrix driving liquid crystal device using the active elements, the pixel electrodes and switching elements are disposed on the substrate (active matrix substrate) corresponding to the intersections of a plurality of scan lines (gate lines) and a plurality of data lines (source lines) which are arranged in transverse and longitudinal directions, respectively.

The switching elements, such as the TFT elements, are turned on by ON signals supplied to the gate lines, and the image signals which are supplied through the source lines are written into the pixel electrodes (transparent electrodes (ITO)). In this way, voltages are applied to the liquid crystal layer between the pixel electrodes and the counter electrodes based on the image signals, whereby the arrangement of the liquid crystal molecules can be changed. By doing so, the transmittance of each pixel is changed, so that the image display can be implemented by changing the light components that pass though the image electrodes and the liquid crystal layer in accordance with the image signals.

In the case where elements constituting an element substrate, such as the TFT substrate, are provided in one plane on the substrate, the occupied area of the elements is increased and the area of the pixel electrodes is reduced, so that the pixel opening ratio may be lowered. Therefore, for a laminated structure adapted in the prior art, elements are separately formed in the respective one of plural layers, and the interlayer insulating films are disposed among the layers (film formation layers) to electrically insulate the film formation layers.

In other words, the element substrates are constructed by laminating film formation layers, such as semiconductor thin films, insulating thin films, and conductive thin films having predetermined patterns on the glass substrate or quartz substrate. The TFT substrate is formed by repeatedly performing film formation processes of various films and photolithography processes on each of the film formation layers. For example, on the TFT substrate, film formation layers, such as semiconductor layers constituting channels of the TFT elements, wiring layers for data lines, and pixel electrode layers made up of ITO film are laminated.

In some cases, on the element substrate, patterns of test elements (hereinafter, referred to as test-element-pattern) referred to as TEG (test element group) may be provided besides the film formation patterns for the device itself. The test elements are provided for the purpose of measuring yield of the device after it has been manufactured, solving problems associated with the deterioration of device performance, and measuring transistor characteristics, contact resistance, or the like. For example, each of the test element patterns having the same structure as an element group including transistors, contact holes, and wiring of each of the pixel regions is provided outside each of the pixel regions, whereby testing for the test element patterns is performed to manage the processes.

In addition, the test element patterns are provided to obtain the characteristics from a surface of the device through pads, specifically, output terminals that are provided in the film formation layers of test element formation regions.

However, a surface of the laminated structure of the film formation layers may have uneven portions depending on the film formation patterns of the respective layers. In the case where such uneven portions occur on layers contacting the liquid crystal layer, alignment failure of the liquid crystal may easily occur. Therefore, in some cases, a planarization process is performed to planarize an interlayer insulating film below a layer near the liquid crystal layer. For example, the interlayer insulating film below each of the pixel electrode layers is polished to be planarized by the so-called CMP (Chemical Mechanical Polishing) process.

In the case where the CMP process is not performed, variations in the film thicknesses of the respective layers are within about 5%, whereas in the case where the CMP process is performed, the film thicknesses in some portions of the interlayer insulating film changes remarkably depending on the unevenness from the film formation patterns. In this case, the variations in the film thicknesses are increased up to 20 to 30%. If so, in some cases, pads (hereinafter, referred to as a deep PAD) formed on a layer just below a thin interlayer insulating film and pads (hereinafter, referred to as a shallow PAD) formed on a layer just below a thick interlayer insulating film may have two different distances from the surface of the device. Therefore, in the case where an interlayer insulating film is removed by an etching process in order to expose two pads to test characteristics of the test element, if only an etching process is performed, a contact hole may be formed in the only shallow PAD, but a contact hole may not be completely opened in the deep PAD. However, if an over-etching process is performed to open the contact hole in the deep PAD, the shallow PAD may be entirely etched and removed. Specifically, there is a problem that, since depths of pads are different depending on the CMP processes, contact holes reaching two respective pads may not be opened by one process.

An approach of providing contact holes in the test element formation regions has been considered in the related art in order to measure the contact resistances of the contact holes in the device. The other contact holes corresponding to the contact holes in the device are provided in the test element formation regions. Even in this case, if the CMP process does not implement planarization, the contact resistances of the contact holes in the device can be estimated by measuring the contact resistances of the other contact holes in the test element formation regions.

However, in the case where the planarization is implemented by the CMP process, depending on the film formation patterns of the respective layers, the locations (depths) of the contact holes in the device with reference to the surface of the device and the depths of the other contact holes formed in the test element formation regions may be different, which presents another problem in that the contact resistances of the contact holes in the device cannot be estimated even by measuring the contact resistances of the other contact holes of the test element formation regions.

SUMMARY OF THE INVENTION

The present invention is contrived in consideration of the aforementioned problems, and provides a test-element-provided substrate, a method of manufacturing the same, a substrate for an electro-optical device, and an electro-optical device capable of accurately estimating the characteristics of film formation patterns and definitely exposing pads in an etching process by forming the same shape film formation layers as the film formation layers in the device below the test element patterns and pads in the test element formation region.

A substrate for an electro-optical device according to an aspect of the present invention includes: a plurality of sub-interlayer-film wiring patterns formed in film formation layers which are disposed above a test-element-provided substrate; interlayer films formed on the plurality of sub-interlayer-film wiring patterns, with the surface of the interlayer films being planarized; a plurality of contact holes formed in the planarized interlayer films corresponding to some of the plurality of sub-interlayer-film wiring patterns; and laminated films provided between the substrate and the plurality of sub-interlayer-film wiring patterns, the thicknesses of regions of the laminated films corresponding to the plurality of contact holes are equalized or substantially equalized.

In accordance with the construction, in the wiring patterns below the interlayer films where the contact holes are formed, since the heights from arbitrary reference planes of the surface of the substrate can be equalized over the entire regions of the surface of the substrate, even after planarizing interlayer films by a CMP process, the lengths of the plurality of contact holes which are formed on the interlayer films can be equalized or approximately equalized. As a result, all the contact holes can be uniformly opened by an interlayer film removing process.

A substrate for an electro-optical device according to an aspect of the present invention includes: above a test-element-provided substrate in which indentations are formed in portions of the surface of the substrate, a plurality of sub-interlayer-film wiring patterns formed in film formation layers disposed in at least one of the indented portions and the other portions; interlayer films formed on the plurality of sub-interlayer-film wiring patterns, with the surface of the interlayer films being planarized; a plurality of contact holes formed in the planarized interlayer films corresponding to some of the plurality of sub-interlayer-film wiring patterns; and laminated films provided between the substrate and the plurality of sub-interlayer-film wiring patterns, the thicknesses of regions of the laminated films corresponding to the plurality of contact holes minus the indentation depth in the normal direction of the substrate are equalized or substantially equalized.

Herein, "indentation depth in the normal direction of the substrate" refers to the depth of a groove in a region trenched by an etching process, for example, from a reference plane, which is an original surface of the substrate and also the highest plane.

In accordance with the construction, even on the substrate having indentations which are formed by cutting some portions of the surface of the substrate, in the wiring patterns below the interlayer films where the contact holes are formed, since the heights from reference planes of the surface of the substrate can be equalized over the entire region of the surface of the substrate, even after planarizing interlayer films by a CMP process, the lengths of each of the plurality of contact holes which are formed on the interlayer films can be equalized or approximately equalized. As a result, all the contact holes including test element formation regions can be uniformly opened by an interlayer film removing process.

A test-element-provided substrate according to an aspect of the present invention includes: a plurality of film formation layers on which respective film formation patterns are formed; interlayer films formed among the plurality of film formation layers; test element patterns formed in test element formation regions with the same material as that of each film formation pattern of at least one film formation layer among the plurality of film formation layers; openings formed in the test element formation regions of an interlayer film of a planarized uppermost layer, thereby exposing a plurality of pads connected to the test element patterns; and dummy patterns formed below the corresponding one of the plurality of pads with the same material as that of each of the film formation patterns of the predetermined film formation layers among the plurality of film formation layers.

In accordance with the construction, the plurality of film formation layers where the respective film formation patterns are formed have a multi-layered structure, and interlayer films are formed among the film formation films. The test element formation region includes the test element patterns, which are formed with the same materials as those of the film formation patterns. The test element patterns are connected to the plurality of pads. Openings are formed by removing the interlayer films on the pads, and the pads are exposed through the openings. The plurality of pads is connected to, for example, a test instrument through the openings, whereby the electrical characteristics of the test element patterns can be obtained. Below the plurality of pads, the respective dummy patterns are formed with the same material as that of each of the film formation patterns of predetermined film formation layers. If the sum of film thicknesses of the film formation layers constituting the dummy patterns below the respective pads is suitably adjusted, the distances from the surfaces of the planarized interlayer films to the plurality of pads can be equalized. As a result, an interlayer film removing operation to expose the plurality of pads can be performed by a single process.

In addition, the dummy patterns are provided to independently control the distances from the surfaces of the planarized interlayer films to the plurality of pads, thereby exposing all the plurality of pads which needs to be exposed by an interlayer film removing process at the time of forming the openings, from the surfaces of the planarized interlayer films to the plurality of pads.

In accordance with the construction, the distances of the plurality of pads from the surfaces of the aforementioned planarized interlayer films can be independently controlled by suitably forming the dummy patterns. As a result, an interlayer film removing process can expose both sides of the plurality of pads.

In addition, the dummy patterns are independently formed below the plurality of pads, whereby the distances from the surfaces of the planarized interlayer films to the plurality of pads are equalized.

In accordance with the construction, each of the dummy patterns is independently formed below the plurality of pads. As a result, the distances of the plurality of pads from the surfaces of the planarized interlayer films can be equalized even in the case where the vertical locations of the plurality of pad are different if the dummy patterns are not disposed, for example, in the case where the vertical locations of the test element patterns are different.

In addition, the dummy patterns are formed below the plurality of pads as film formation patterns of the same film formation layers.

In accordance with the construction, since the film formation patterns of the same film formation layer are formed below the plurality of pads, the distances of the plurality of pads from the surface of the planarized interlayer films can be equalized.

In addition, the dummy patterns are formed below the plurality of pads as two separated patterns.

In accordance with the construction, the sizes of the dummy patterns can be formed smaller than that of the case where they are formed with a continuous single pattern. As a result, the stress can be reduced, thereby reducing or preventing cracks from being generated.

In addition, the openings are removed by etching the planarized interlayer films, and the dummy patterns have respective margins corresponding to allowable over-etching amounts for the plurality of pads, thereby independently controlling the distances from the surfaces of the planarized interlayer films to the plurality of pads.

In accordance with the construction, even in the case where the distances between the plurality of pads and the surfaces of the planarized interlayer films are different from each other, only the one side of the pads is over-etched in a permissible range, and both of the plurality of pads can be exposed by an etching process.

A test-element-provided substrate according to an aspect of the present inventing includes: a plurality of film formation layers on which respective film formation patterns are formed; interlayer films formed among the plurality of film formation layers; first contact holes formed in the planarized interlayer films on predetermined wiring layers among the plurality of film formation layers, thereby being electrically connected to the wiring layers; wiring patterns being formed on test element formation regions with the same materials as those of the film formation patterns of the wiring layers during a film formation process of the predetermined wiring layers; second contact holes formed in the planarized interlayer films on the wiring patterns, thereby being electrically connected to the wiring patterns; openings formed in the test element formation regions of an interlayer film of a planarized uppermost layer, thereby exposing pads connected to the wiring patterns through the second contact holes; and dummy patterns formed below the wiring patterns.

In accordance with the construction, the plurality of film formation layers where the respective film formation patterns are formed have a multi-layered structure, and interlayer films are formed among the film formation films. On the predetermined wiring layers among the plurality of film formation layers, planarized interlayer films are formed, and on the interlayer films, the first contact holes that are electrically connected to the wiring layers are formed. On the other hand, in the film formation process of the predetermined wiring layers, the wiring patterns are formed on the test element formation regions with the same materials as those of the film formation patterns of the wiring layers. On the planarized interlayer films of the wiring patterns, the second contact holes that are electrically connected to the wiring patterns are formed. The wiring patterns are connected to the pads through the second contact holes. The openings are formed by removing the interlayer films on the pads, and the pads are exposed through the openings. The pads are connected to, for example, a test instrument through the openings, whereby the electrical characteristics of the second contact holes through the wiring patterns can be obtained. Below the wiring patterns, the dummy patterns are formed with the same material as those of the respective film formation patterns of the predetermined film formation layers. If the sum of film thicknesses of the film formation layers constituting the dummy patterns below the wiring patterns is suitably adjusted, distances from the surfaces of the planarized interlayer films to the wiring patterns and distances from the surfaces of the planarized interlayer films to the wiring layers can be equalized to each other. As a result, the characteristics of the first contact holes on the wiring layers can be estimated by testing the second contact holes.

In addition, the dummy patterns are formed below the wiring patterns, whereby the distances from the surfaces of the planarized interlayer films to the wiring layers and the distances from the surfaces of the planarized interlayer films to the wiring patterns are equalized.

In accordance with the construction, the characteristics of the second contact holes can be equalized to the characteristics of the first contact holes, so that the characteristics of the second contact holes can be estimated by the test of the characteristics of the second contact holes on the test element formation region.

In addition, the dummy patterns are formed below the wiring patterns with the same materials as those of the film formation patterns of the film formation layers, which are formed below the predetermined wiring layers.

In accordance with the construction, the distances from the surfaces of the planarized interlayer films to the wiring layers and the distances from the surfaces of the planarized interlayer films to the wiring patterns can be equalized.

In addition, the dummy patterns extend from at least some of the film formation patterns of the film formation layers.

In accordance with the construction, since the dummy patterns below the test element formation regions and each of the film formation patterns of the film formation layers that are formed below predetermined wiring layers on the pixel regions or the real driving region other than the pixel region have the same electric potential, the conditions, such as parasite capacitance from the dummy patterns, also become the same condition as the pixel regions or the real driving regions other than the pixel region, so that a test can be performed with high accuracy while the conditions for the parasite capacitance can be equalized.

Furthermore, a method of manufacturing a test-element-provided substrate according to an aspect of the present invention includes the steps of: forming a plurality of dummy patterns with the same materials as those of film formation patterns of predetermined film formation layers among a plurality of film formation layers to be laminated, thereby controlling the heights of a plurality of pad formation regions in test element formation regions; forming interlayer films on the predetermined film formation layers; forming test element patterns in the test element formation regions at the same time of the step of forming the film formation patterns; and forming openings in the test element formation regions of an interlayer film of a planarized uppermost layer, thereby exposing a plurality of pads connected to the test element patterns.

In accordance with the construction, a plurality of dummy patterns are formed below the test element patterns to control the heights of the plurality of pad formation regions. The test element patterns are formed on the test element formation regions at the same time of process of forming the film formation patterns. The plurality of pads connected to the test element patterns is exposed by forming openings on the test element formation regions of the uppermost layer of the planarized interlayer films. Since the heights of the plurality of pads are controlled by the dummy patterns, a single process can form the openings that are formed on the interlayer films to expose the plurality of pads.

In addition, a method of manufacturing a test-element-provided substrate according to an aspect of the present invention includes the steps of: forming a plurality of dummy patterns with the same materials as those of film formation patterns of predetermined film formation layers among a plurality of film formation layers to be laminated, thereby controlling the heights of a plurality of contact hole formation regions in test element formation regions; forming predetermined wiring layers among the plurality of film formation layers, and at the same time, forming wiring patterns in test element formation regions with the same materials as those of film formation patterns of the wiring layers in a film formation process of the predetermined wiring layers; forming first contact holes in planarized interlayer films on the wiring layers, thereby making conduction to the wiring layers possible, and at the same time, forming second contact holes in the planarized interlayer films on the wiring patterns, thereby making conduction to the wiring patterns; and forming openings in the test element formation regions of an interlayer film of a planarized uppermost layer, thereby exposing pads connected to the second contact holes.

In accordance with the construction, on the test element formation regions, the dummy patterns to control the heights of the contact hole formation regions are formed. The wiring patterns are formed on the dummy patterns. In addition, the second contact holes are formed on the planarized interlayer films, which are on the wiring patterns. The vertical locations, for example, of the wiring patterns can be equalized to the vertical locations of the wiring layers by suitably adjusting the dummy patterns.

As a result, the characteristics of the second contact holes can be equalized to the characteristics of the first contact holes on the wiring layers, so that the characteristics of the first contact holes can be estimated based on the characteristics of the second contact holes by using the pads, which are formed in the test element formation region.

A substrate for an electro-optical device according to an aspect of the present invention includes: a pixel electrode layer where film formation patterns of pixel electrodes are provided corresponding to the intersections of a plurality of data lines and a plurality of scan lines which are disposed in a lattice shape in a plane; a first film formation layer where film formation patterns of the plurality of data lines are provided; a second film formation layer where film formation patterns of the plurality of scan lines and film formation patterns of switching elements for supplying signals to the pixel electrodes are provided; interlayer films formed among the pixel electrode layer, the first film formation layer, and the second film formation layer; test element patterns formed in test element formation regions with the same material as that of each of the film formation patterns of at least one of the pixel electrode layer, the first film formation layer, and the second film formation layer, or other film formation layers; openings formed in the test element formation regions of an interlayer film of a planarized uppermost layer, thereby exposing a plurality of pads connected to the test element patterns; and dummy patterns formed below the corresponding one of the plurality of pads with the same material as that of each of film formation patterns of predetermined film formation layers among the plurality of film formation layers.

In accordance with the construction, the pixel electrode layer, the first film formation layers of the film formation patterns of the data lines, and the second film formation layer of the film formation patterns of the scan lines are formed. The test element patterns are formed with the same material as those of the film formation patterns of the aforementioned film formation layers or the other film formation layers. The vertical locations of the plurality of pads connected to the test element patterns are defined by the dummy patterns. As a result, the characteristics of each of the film formation layers can be tested by using the pads of the test element formation regions.

In addition, in a substrate for an electro-optical device according to an aspect of the present invention, the dummy patterns extends from at least some of the film formation patterns of the predetermined film formation layers among the plurality of film formation layers. In accordance with the construction, in the case where the aforementioned dummy patterns exist below the test element formation regions, the dummy patterns have the same electrical potential as each of the film formation patterns of the film formation layers formed below the predetermined wiring layers of the pixel region or the real driving regions other than the pixel region. As a result, the conditions, such as parasite capacitance from the dummy patterns, also become the same as the condition in the pixel regions or the real driving regions other than the pixel region, so that the test can be performed with high accuracy while the conditions for the parasite capacitance can be equalized.

In addition, a substrate for an electro-optical device according to an aspect of the present invention includes: a pixel electrode layer where film formation patterns of pixel electrodes are provided to correspond to the intersections of a plurality of data lines and a plurality of scan lines which are disposed in a lattice shape in a plane; a first film formation layer where film formation patterns of the plurality of data lines are provided; a second film formation layer where film formation patterns of the plurality of scan lines and film formation patterns of switching elements for supplying signals to the pixel electrodes are provided; interlayer films formed among the pixel electrode layer, the first film formation layer, and the second film formation layer; first contact holes formed in planarized interlayer films on predetermined wiring layers of at least one of the pixel electrode layer, the first film formation layer, and the second film formation layer, or other film formation layers, thereby being connected electrically to the wiring layers; wiring patterns being formed on the test element formation regions with the same materials as those of the film formation patterns of the wiring layers during a film formation process of the predetermined wiring layers; second contact holes formed in the planarized interlayer films on the wiring patterns, thereby being electrically connected to the wiring patterns; openings formed in the test element formation regions of an interlayer film of a planarized uppermost layer, thereby exposing pads connected to the wiring patterns though the second contact holes; and dummy patterns formed below the wiring patterns.

In accordance with the construction, the pixel electrode layer, the first film formation layers of the film formation patterns of the data lines, and the second film formation layer of the film formation patterns of the scan lines are formed. The wiring patterns are formed with the same material as the film formation patterns of the aforementioned film formation layers or the other film formation layers. The wiring patterns are connected to the pads through the second contact holes, which are formed on the planarized interlayer films. The vertical locations of the wiring patterns are defined by the dummy patterns formed below the wiring patterns. As a result, since the characteristics of the second contact holes can be equalized to the characteristics of the first contact holes on the wiring layers, the characteristics of the first contact holes can be estimated by using the pads of the test element formation regions.

In addition, an electro-optical device according to an aspect of the present invention is constructed by using the aforementioned substrates for an electro-optical device. In addition, an electronic apparatus according to an aspect of the present invention is constructed by using the aforementioned electro-optical device.

In accordance with the construction, pads can be opened by a single process, and various kinds of electrical characteristics including contact resistance can be definitely tested, so that a device having efficient electrical characteristics can be obtained.

BRIEF DESCRIPTION OF THE DRAWINGS

FIGS. 11(A) and 11(B) are views for explaining a second exemplary embodiment of the present invention.

DETAILED DESCRIPTION OF EXEMPLARY EMBODIMENTS

Figure 1:
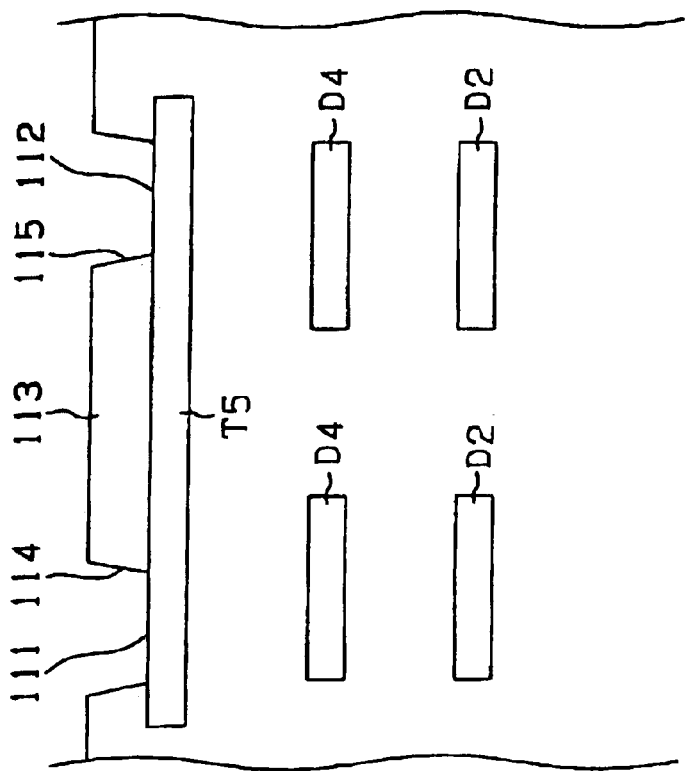
FIG. 1 is a view for explaining a cross-sectional structure of a test element formation portion in a test-element-provided substrate according to a first exemplary embodiment of the present invention.
Figure 1:
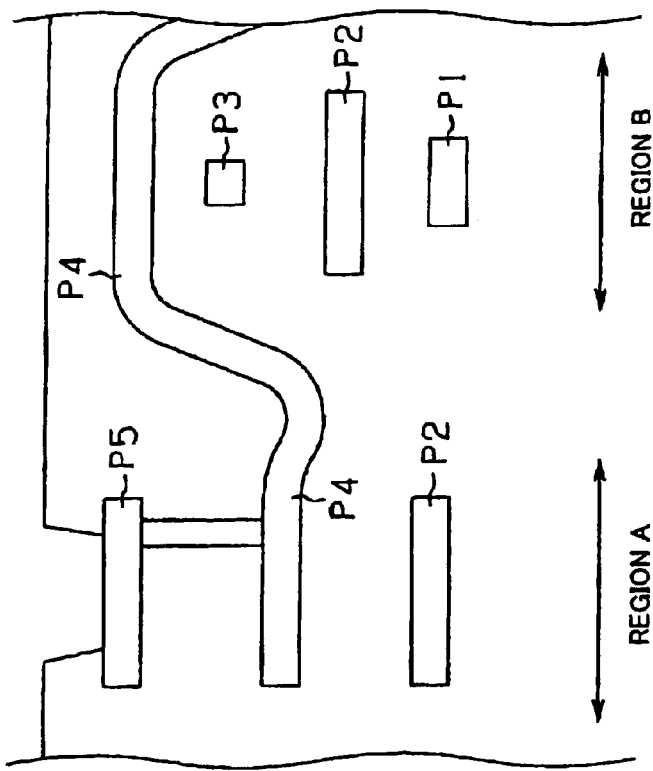
Figure 2:
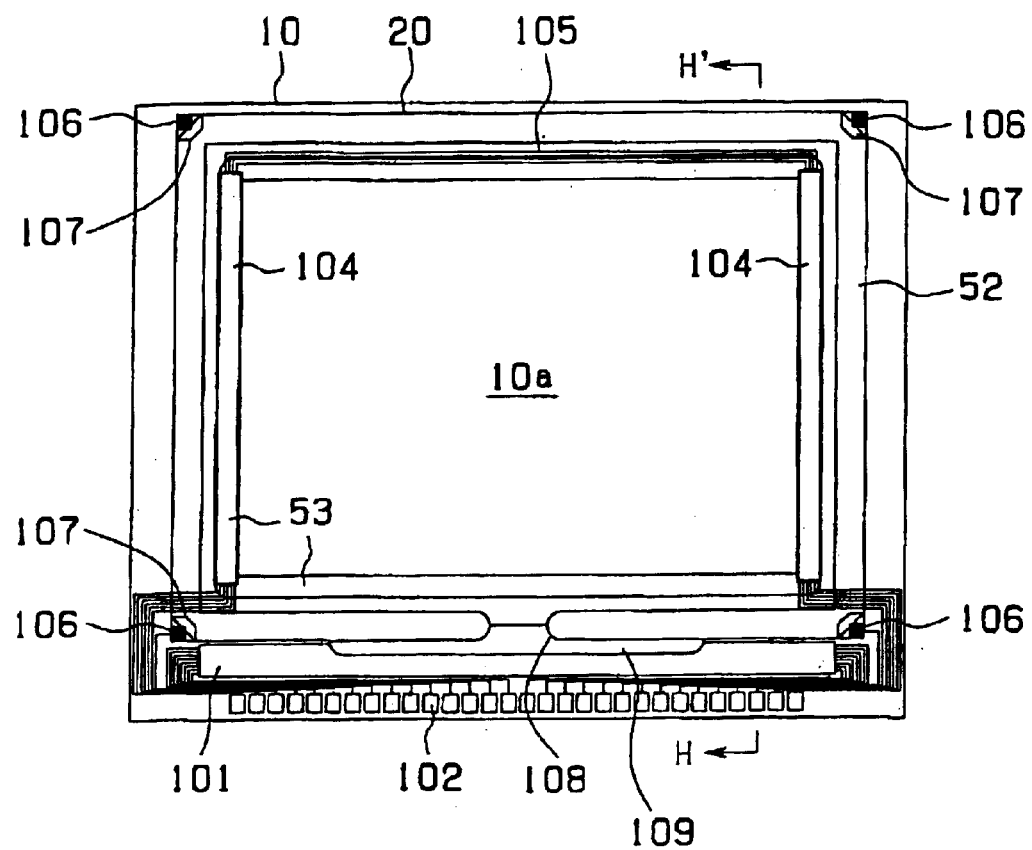
FIG. 2 is a plan view illustrating a liquid crystal device, that is, an electro-optical device, which is constructed by using a substrate for a liquid crystal device, that is, a substrate for an electro-optical device in the exemplary embodiment, and components provided thereon as viewed at the side of a counter substrate.
Figure 3:
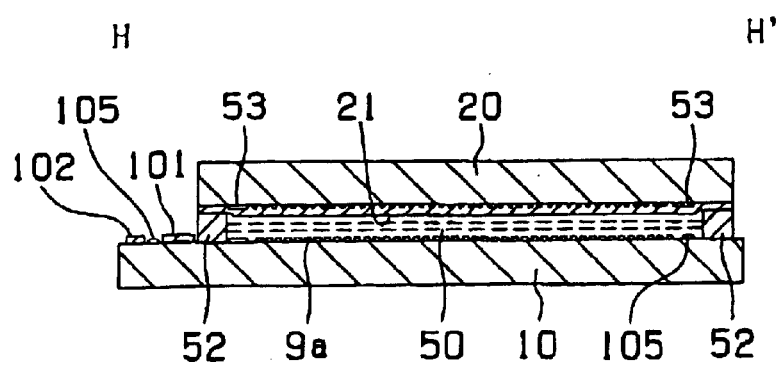
FIG. 3 is a cross-sectional view, which is taken along plane H–H' in FIG. 2, illustrating a liquid crystal device after the completion of an assembly process for bonding an element substrate and a counter substrate and sealing liquid crystal.
Figure 4:
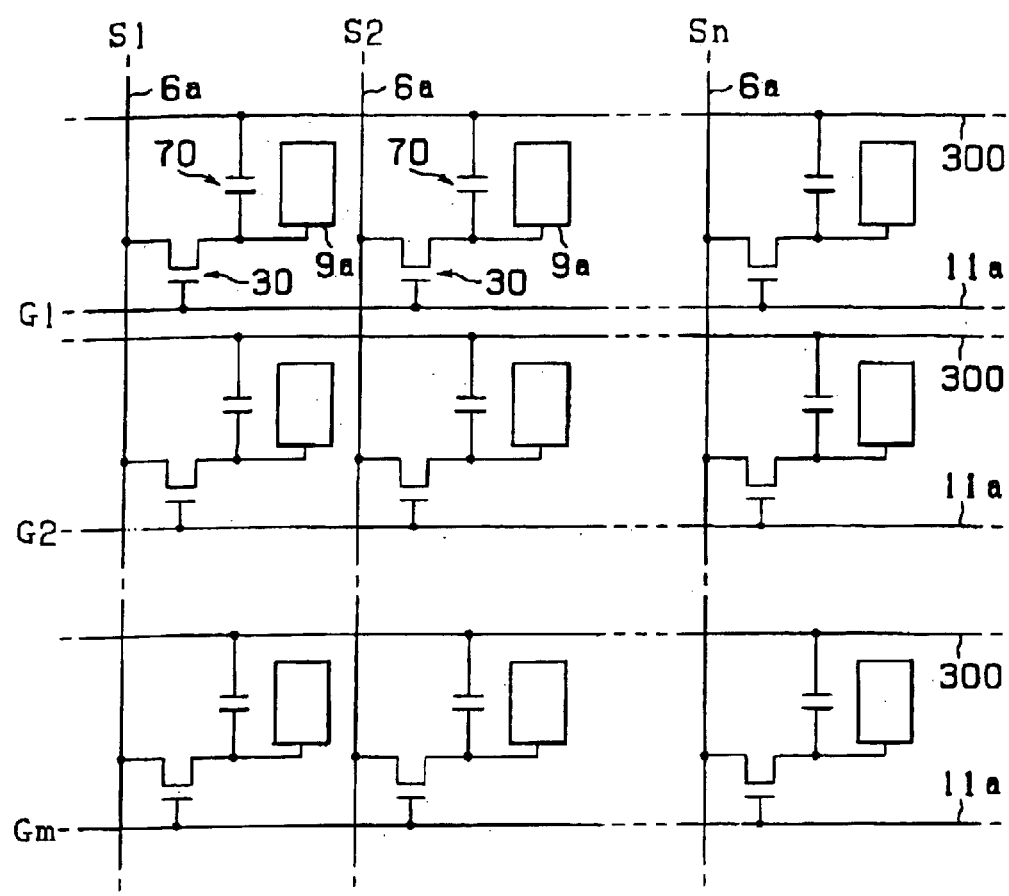
FIG. 4 is an equivalent circuit schematic illustrating various elements, wiring, etc. in a plurality of pixels constituting pixel regions of a liquid crystal device.
Figure 5:
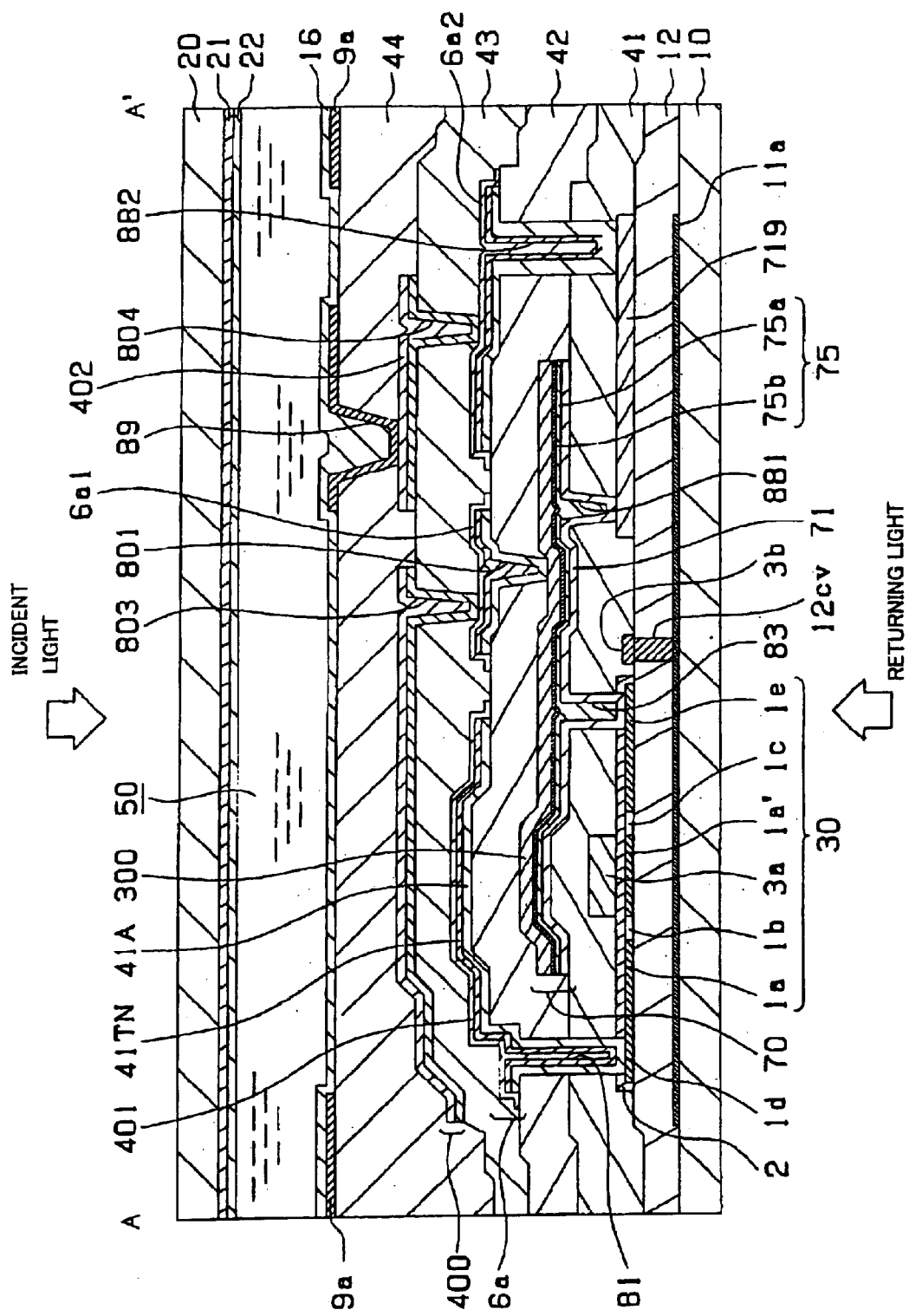
FIG. 5 is a cross-sectional view illustrating a structure of one pixel of a liquid crystal device in detail.
Figure 6:
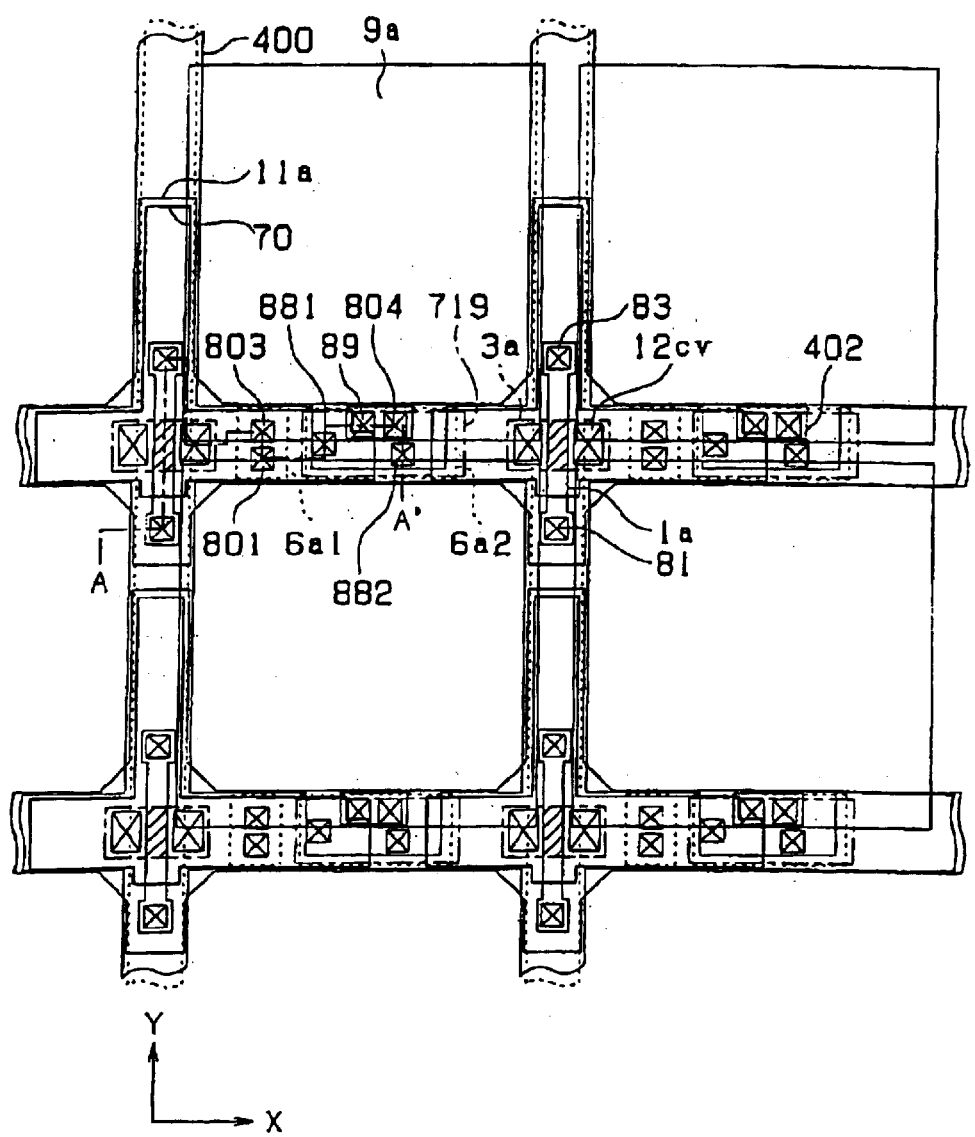
FIG. 6 is a plan view illustrating film formation patterns of each of layers for a plurality of adjacent pixels formed on a TFT substrate in an exemplary embodiment.
Figure 7:
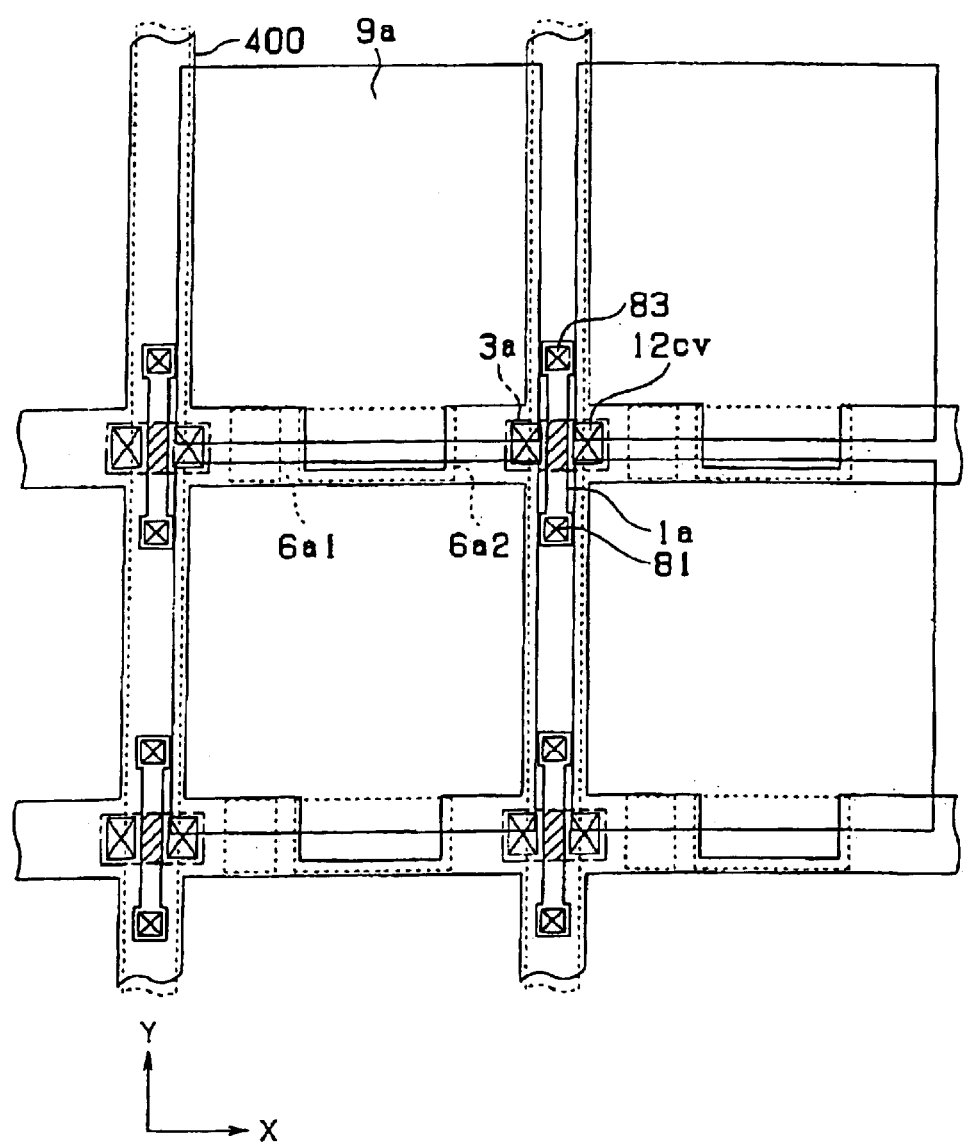
FIG. 7 is a plan view illustrating film formation patterns of the main parts in FIG. 6.
Figure 8:
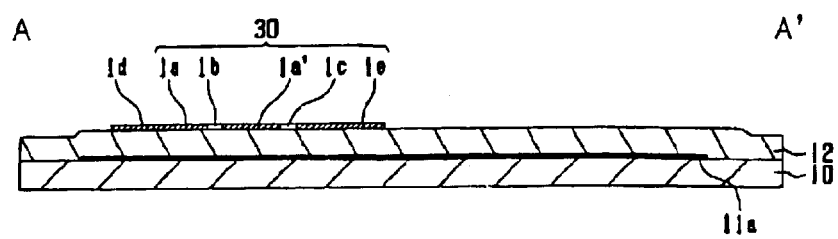
FIG. 8 is a process view illustrating a method of manufacturing a substrate for a liquid crystal device in a sequence of processes as cross-sectional views.
Figure 8:
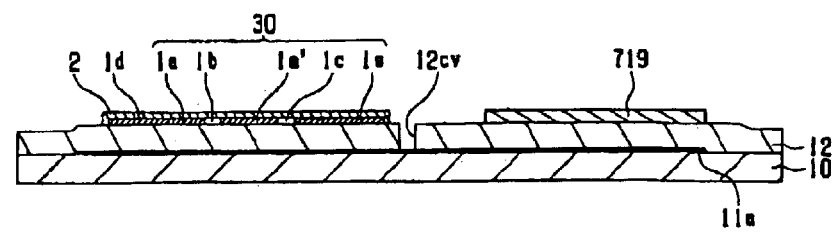
Figure 8:
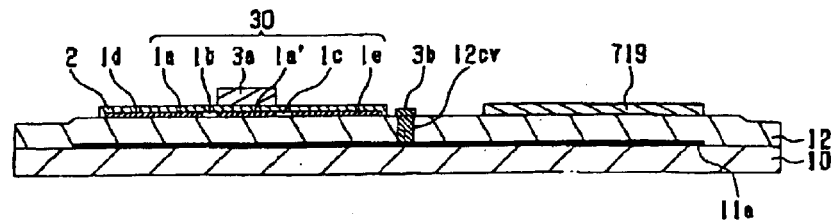
Figure 8:
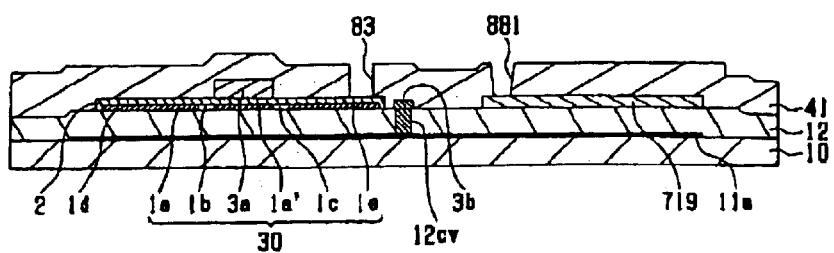
Figure 8:
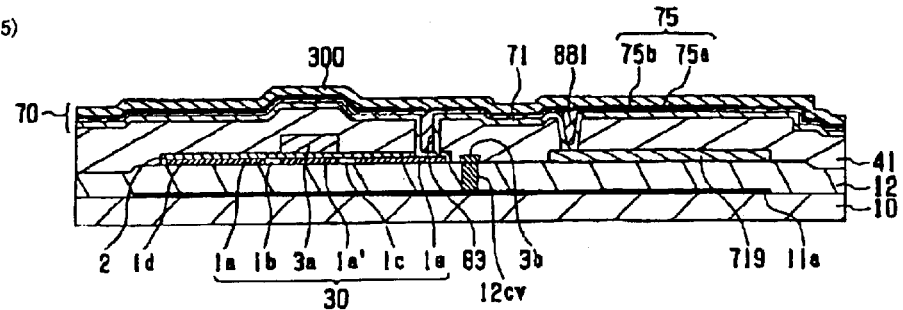
Figure 9:
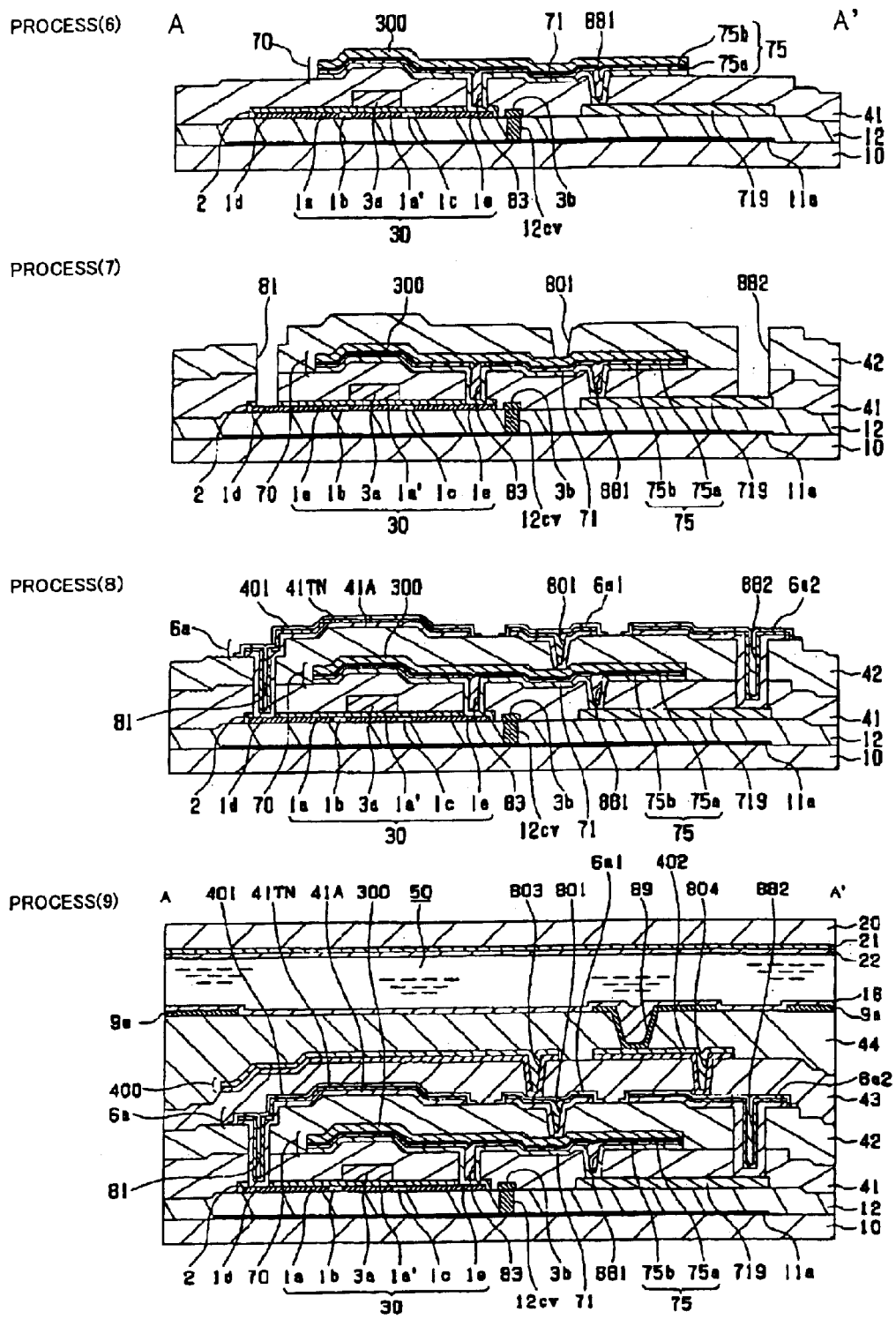
FIG. 9 is a process view illustrating a method of manufacturing a substrate for a liquid crystal device in a sequence of processes as cross-sectional views.

Now, exemplary embodiments of the present invention will be described in detail with reference to the accompanying figures. FIG. 1 is a view for explaining a cross-sectional structure of a test element formation region in a test-element-provided substrate according to a first exemplary embodiment of the present invention. In the exemplary embodiment, a substrate for a liquid crystal device, such as a TFT substrate, that is, a substrate for an electro-optical device is adapted as the test-element-provided substrate. FIG. 2 is a plan view illustrating a liquid crystal device, that is, an electro-optical device, which is constructed by using a substrate for a liquid crystal device, that is, a substrate for an electro-optical device in the exemplary embodiment, and components provided thereon as viewed at the side of a counter substrate. FIG. 3 is a cross-sectional view, which is taken along plane H–H' in FIG. 2, illustrating a liquid crystal device after the completion of an assembly process to bond a element substrate and a counter substrate and sealing liquid crystal. FIG. 4 is an equivalent circuit schematic illustrating various elements, wiring, etc. in a plurality of pixels constituting pixel regions (element regions) of a liquid crystal device. FIG. 5 is a cross-sectional view illustrating a structure of one pixel of a liquid crystal device in detail. In addition, FIG. 6 is a plan view illustrating film formation patterns of each of layers for a plurality of adjacent pixels formed on a TFT substrate in the exemplary embodiment. FIG. 7 is a plan view illustrating film formation patterns of the main parts in FIG. 6. FIGS. 8 and 9 are process views illustrating a method of manufacturing the substrate for a liquid crystal device in an order of processes as cross-sectional views. In addition, in the aforementioned figures, layers and members are illustrated on different scales in order to make the layers and members recognizable on the figures.

The test elements are provided to regions outside the pixel regions (hereinafter, in some cases, referred to as element regions). In the exemplary embodiment, in addition to test element patterns and interlayer insulating films, the same film formation patterns as those of the pixel regions are formed below the test element patterns in the test element formation regions, whereby the locations (depths) of a pair of pads with reference to a surface of a device are substantially equalized, so that the pair of pads can be formed with an etching process.

First, a whole construction of the liquid crystal device constructed by using the substrate for a liquid crystal device according to an exemplary embodiment with reference to FIGS. 2 to 4 will be described.

As shown in FIGS. 2 and 3, the liquid crystal device is constructed by sealing a liquid crystal 50 between a TFT substrate 10, which is an element substrate, and a counter substrate 20. On the TFT substrate 10, pixel electrodes (ITO) 9a, etc. constituting pixels are disposed in a matrix shape. In addition, counter electrodes (ITO) 21 are provided over the entire surface of the counter substrate 20. FIG. 4 illustrates an equivalent circuit schematic of elements constituting pixels on the TFT substrate 10.

As shown in FIG. 4, in the pixel regions, a plurality of scan lines 11a and a plurality of data lines 6a are wired to intersect each other, and pixel electrodes 9a are disposed in a matrix shape on regions which are partitioned by the scan lines 11 a and the data lines 6a. In addition, TFTs 30 are provided corresponding to the intersections of the scan lines 11a and the data lines 6a, and the pixel electrodes 9a are connected to the TFTs 30.

The TFTs 30 are turned on by ON signals from the scan lines 11a, and thus, image signals, which are supplied to the data lines 6a, are supplied to the pixel electrodes 9a. A voltage is applied to the liquid crystal 50 between each of the pixel electrodes 9a and each of the counter electrodes 21 which are formed on the counter substrate 20. In addition, storage capacitors 70 are disposed in parallel to the respective pixel electrodes 9a. By each of the storage capacitors 70, the voltage of the corresponding pixel electrode 9a can be maintained for a period of time, which is, for example, three digits longer than the time of the application of a source voltage. By the storage capacitors 70, the so-called voltage maintaining property is enhanced, so that image display can be implemented in a high contrast ratio.

FIG. 5 is a schematic cross-sectional view of the liquid crystal device focusing attention on one pixel, and FIGS. 6 and 7 are plan views illustrating film formation patterns of layers.

In FIG. 6, a plurality of the pixel electrodes 9a (of which contours are shown by dotted lines) are provided in a matrix shape on the TFT substrate 10, and the data lines 6a and the scan lines 11a are provided along the longitudinal and transverse boundaries of the pixel electrodes 9a. As described later, the data lines 6a are formed in a laminated structure including an aluminum film, or the like, and the scan lines 11a are, for example, made of conductive polysilicon films, or the like. In addition, the scan lines 11a are electrically connected to the respective gate electrodes 3a facing channel regions 1a', which are indicated by right-upwardly-slanted regions in the figure, on the semiconductor layers 1a. That is, at each of the intersections of the scan lines 11a and the data lines 6a, each gate electrode 3a and each channel region 1a' which are connected to the corresponding scan line 11a are disposed opposite to each other, whereby the pixel switching TFT 30 is constructed.

As shown in FIG. 5, which is a cross-sectional view taken along plane A–A' in FIG. 6, the electro-optical device includes the TFT substrate 10, which is made of, for example, a quartz substrate, a glass substrate, or a silicon substrate, and the counter substrate 20, which is made of, for example, a glass substrate or a quartz substrate, that faces the TFT substrate.

As shown in FIG. 5, the pixel electrodes 9a are formed on the TFT substrate 10, and an alignment film 16, which is subjected to a predetermined alignment process, such as a rubbing process, is provided above the pixel electrodes. The pixel electrodes 9a are made of a transparent conductive film, such as an ITO film, for example. On the other hand, the counter electrodes 21 are provided over the entire surface of the counter substrate 20, and another alignment film 22, which is subjected to a predetermined alignment process, such as a rubbing process, is provided over the entire surface thereof. Similar to the aforementioned pixel electrodes 9a, the counter electrodes 21 are made of a transparent conductive film, such as an ITO film, for example, and the alignment films 16 and 22 are made of a transparent organic film, such as a polyimide film, for example.

Between the TFT substrate 10 and the counter substrate 20 which are disposed opposite to each other in this way, an electro-optical material, such as a liquid crystal is sealed into a space surrounded by a seal member 52 (see FIGS. 2 and 3), whereby the liquid crystal layer 50 is formed. In a state where no electric field is applied from the pixel electrodes 9a, the liquid crystal layer 50 has a predetermined alignment due to the alignment films 16 and 22. The liquid crystal layer 50 is made up of an electro-optical material of one kind or a mixture of several kinds of nematic liquid crystal. The sealing member 52, which bonds the TFT substrate 10 and the counter substrate 20 along the circumferences thereof, is an adhesive agent made up of, for example, a photo-curing resin or a thermo-setting resin into which spacers, such as glass fiber or glass beads are mixed to maintain the distance between both substrates in a predetermined value.

On the other hand, various components in addition to the pixel electrodes 9a, the alignment film 16, and various elements are provided in a laminated structure on the TFT substrate 10. The laminated structure includes, in a sequence from the bottom as shown in FIG. 5, a first layer (film formation layer) having the scan lines 11a, a second layer having TFTs 30 including the gate electrodes 3a, a third layer having storage capacitors 70, a fourth layer having data lines 6a, a fifth layer having shield layers 400, and a sixth layer (uppermost layer) having the aforementioned pixel electrodes 9a and the alignment film 16. In addition, a base insulating film 12, a first interlayer insulating film 41, a second interlayer insulating film 42, a third interlayer insulating film 43, and a fourth insulating film 44 are provided between the first and second layers, between the second and third layers, between the third and fourth layers, between the fourth and fifth layers, and between the fifth and sixth layers, respectively, to reduce or prevent short circuits from occurring among the aforementioned components. In addition, in various kinds of the insulating films 12, 41, 42, 43 and 44, for example, contact holes to electrically connect the data lines 6a and heavily concentrated source regions 1d on the semiconductor layers 1a of the TFTs 30 are provided. Now, the components will be described in sequence from the bottom.

The scan lines 11a, which are formed on the first layer, are made up of a single metal, an alloy, a metal silicide, a polysilicide, a laminated one thereof, or a conductive polysilicon which contains at least one of refractory metals such as Ti (titanium), Cr (chromium), W (tungsten), Ta (tantalum), Mo (molybdenum), or the like.

Each of the scan lines 11a is patterned in a stripe shape along the X direction in FIG. 6 in plan view. More specifically, each of the stripe-shaped scan lines 11a include a main line (extended along the X direction in FIG. 6) and protrusion portions (extended along the Y direction in FIG. 6) to each of which the data lines 6a or shield layers 400 extends. In addition, the protrusion portions extended from the adjacent scan lines 11a are not connected to each other, whereby the scan lines 11a are disposed in an individually separated manner.

In this way, each of the scan lines 11a has a function of simultaneously turning ON or OFF the TFTs 30 provided in the same row. In addition, the scan lines 11a, which are provided to substantially bury the regions where the pixel electrodes 9a are not provided, also have the function of shielding light components incident to the TFTs 30 from the lower sides thereof. As a result, the occurrence of light leakage current in the semiconductor layers 1a of the TFTs 30 is suppressed, so that image display having a high quality can be implemented without any flicker, etc.

The TFTs 30 including the gate electrodes 3a are formed on the second layer. As shown in FIG. 5, each of the TFTs 30, which has an LDD (Lightly Doped Drain) structure, includes the aforementioned gate electrode 3a, the channel region 1a' of the semiconductor layer 1a made of, for example, a polysilicon film in which a channel is generated by an electric field from the gate electrode 3a, an insulating film 2 having a gate insulating film to insulate the gate electrode 3a from the semiconductor layer 1a, a lightly doped source region 1b, a lightly doped drain regions 1c, a heavily doped source regions 1d, and a heavily doped drain regions 1e within the semiconductor layer 1a, as its components.

In addition, a relay electrode 719 is formed on the second layer as the same film as the aforementioned gate electrode 3a. As shown in FIG. 6, the relay electrode 719 is formed in an island shape to be located at the approximate center of one side of each of the pixel electrodes 9a, as viewed in plan. Since the relay electrode 719 and the gate electrode 3a are formed with the same film, if the latter is made of, for example, a conductive polysilicon film, etc., the former is also made up of the conductive polysilicon film, etc.

In addition, although the aforementioned TFTs 30 preferably have the LDD structure as shown in FIG. 5, the TFTs may have an offset structure, in which an impurity implantation is not performed into the lightly doped source region 1b and the lightly doped drain region 1c. Otherwise, the TFTs may be a self-aligned TFT, in which a high concentration of impurities are implanted by using the gate electrode 3a as a mask to form the heavily doped source region and the heavily doped drain region in a self-aligned manner. In addition, although the exemplary embodiment is adapted to a single gate structure, in which one gate electrode of each of the pixel switching TFTs 30 is provided between the heavily doped source region 1d and the heavily doped drain region 1e, two or more gate electrodes may be disposed between them. In this way, if the TFTs are constructed with dual gates, triple gates, or more, leakage current at junction portions between the channel and the source and drain regions can be reduced or prevented, and thus, current at the time of OFF can be reduced.

In addition, the semiconductor layer 1a constituting each of the TFTs 30 can be constructed with either a non-single crystal layer or a single crystal layer. For the formation of the single crystal layer, a junction method or the other well-known methods may be used. In particular, if the semiconductor layer 1a is constructed with the single crystal layer, high performance of peripheral circuits can be obtained.

Above each of the scan lines 11a and below each of the TFTs 30, a base insulating film 12, which is made of, for example, a silicon oxide film, etc., is provided. In addition to the function of insulating each of the TFTs 30 from each of the scan lines 11a, the base insulating film 12, which is provided over the entire surface of the TFT substrate 10, has a function of reducing or preventing characteristics of each of the pixel switching TFT's 30 from changing due to the roughness created from the polishing of the surface of the TFT substrate 10 or contamination after a cleaning process.

On the base insulating film 12, a groove (contact hole) 12cv of which a width is equal to the channel length of the semiconductor layer 1a being extended along each of the data lines 6a is carved at both sides of the semiconductor layer 1a as viewed in plan, and the gate electrode 3a which is laminated above the corresponding groove 12cv includes a concave-shaped portion at the lower side. In addition, since the gate electrode 3a is formed to bury the entire of the groove 12cv, a sidewall 3b is integrated with and extended to the gate electrode 3a. In this way, as shown in FIG. 6, since the semiconductor layer 1a of each of the TFTs 30 is covered from its side as viewed in plan, incidence of light components from at least the related portions can be suppressed.

In addition, while the sidewall 3b is formed to be buried in the aforementioned groove 12cv, a lower end of the sidewall is formed to contact the corresponding one of the scan lines 11a. Herein, since each of the scan lines 11a is provided in the stripe shape as described above, the gate electrodes 3a and the scan lines 11a which exist along with a certain row always have the same potential, as long as the certain row is considered.

In addition, a structure in which additional scan lines having the gate electrodes 3a are provided parallel to the scan lines 11a may be adapted. In this case, the scan lines 11a and the additional scan lines have a redundant wiring structure. As a result, even in the case where normal conduction is not possible due to the failure of some of the scan lines 11a, as long as the additional scan lines existing along the same row as the scan lines 11a are in a normal state, operational control of the TFTs 30 can still be normally performed by means of the additional scan lines.

Each of the storage capacitors 70 is provided in the third layer. In each of the storage capacitors 70, a lower electrode 71 (a pixel potential capacitor electrode connected to the heavily doped drain region 1e and the pixel electrode 9a of the corresponding TFT 30) and a capacitor electrode 300 (a fixed potential capacitor electrode) are provided to face each other through a dielectric film 75. By the storage capacitors 70, the potential holding characteristics of the pixel electrodes 9a can be remarkably enhanced.

In addition, as shown in the plan view of FIG. 6, since the storage capacitors 70 are provided not to reach the respective light-transmitting regions which approximately correspond to regions for forming the pixel electrodes 9a (that is, since the storage capacitors are provided to be received in the respective light-shielding regions), the total of the pixel opening ratios of the electro-optical device is maintained at a relatively large value, so that a brighter image display can be implemented.

More specifically, the lower electrode 71 is made of, for example, a conductive polysilicon film and functions as the pixel potential capacitor electrode. However, the lower electrode 71 may be made of a single film or a multi-layered film, which contains a metal or an alloy. In addition to the function of the pixel potential capacitor electrode, the lower electrode 71 also has the function of a relay connection between the corresponding pixel electrode 9a and the corresponding heavily doped drain region 1e of each of the TFTs 30. The relay connection can be implemented through the aforementioned relay electrode 719, which will be described later.

The capacitor electrode 300 functions as the fixed potential capacitor electrode 70 of the storage capacitor. The capacitor electrode 300 can be kept at a fixed potential by being connected electrically to a shield layer 400, which is kept at a fixed potential.

In addition, each of the capacitor electrodes 300 are provided in an island shape to correspond to each of the pixels on the TFT substrate 10. The lower electrodes 71 have approximately the same shape as the capacitor electrodes 300. As a result, each of the storage capacitors 70 has no unnecessary spreading in a plane, that is, no reduction in the pixel opening ratio, and it can obtain a maximum of capacitance under the aforementioned situation. For example, each of the storage capacitors 70 has a smaller area and a larger capacitance.

As shown in FIG. 5, the dielectric film 75 is made of a silicon oxide film, such as a HTO (High Temperature Oxide) film and a LTO (Low Temperature Oxide) film or a silicon nitride film, which has a relatively thin thickness of 5 to 200 nm. In terms of increasing the capacitance of the storage capacitors 70, the thinner dielectric film 75 is preferable as long as the reliability of the film is sufficient. In addition, as shown in FIG. 5, the dielectric film 75 has a two-layered structure in which the lower layer is made of a silicon oxide film 75a and the upper layer is made of a silicon nitride film 75b. Since the silicon nitride film 75b having a relatively high dielectric constant is provided, the capacitance of each of storage capacitors 70 can be increased, and since the silicon oxide film 75a is provided, the dielectric strength of the storage capacitors 70 cannot be deteriorated. In this way, since the dielectric film 75 is formed in the two-layered structure, it is possible to have the two contradictory functions and effects simultaneously.

In addition, since the silicon nitride film 75b is provided, water can be reduced from or prevented from permeating the TFTs 30 in advance. As a result, in absence of the increase in threshold voltages of the TFTs 30, it is possible to maintain the device for a relatively long time. In addition, although the dielectric film 75 has the two-layered structure in the exemplary embodiment, the dielectric film may be constructed in a three-layered structure having a silicon oxide film, a silicon nitride film, and a silicon oxide film, for example, or a more-than-three-layered structure.

A first interlayer insulating film 41, which is made of, for example, a silicate glass film, such as NSG (Non-Silicate Glass), PSG (Phosphorus Silicate Glass), BSG (Boron Silicate Glass), and BPSG (Boron Phosphorus Silicate Glass), a silicon nitride film, a silicon oxide film, or the like, or preferably NSG, is provided above each of the TFTs 30 or each of the gate electrodes 3a and each of the relay electrodes 719 and below each of the storage capacitors 70. In addition, on the first interlayer insulating film 41, the contact hole 81 which electrically connects the heavily doped source region 1d of each of the TFTs 30 and a corresponding data line 6a which will be described later is opened while passing through a second interlayer insulating film 42 which will be described later. In addition, the contact hole 83, which electrically connects the heavily doped drain region 1e of each of the TFTs 30 and the lower electrode 71 constituting each of the storage capacitors 70, is opened on the first interlayer insulating film 41.

In addition, on the first interlayer insulating film 41, the contact hole 881, which electrically connects the lower electrode 71 serving as the pixel potential capacitor electrode constituting each of the storage capacitors 70 and the relay electrode 719, is opened. Moreover, on the first interlayer insulating film 41, the contact hole 882 which electrically connects the relay electrode 719 and a second relay electrode 6a2 which is described later is opened while passing through the described-later second-interlayer insulating film.

As shown in FIG. 5, since the contact hole 882 is provided in a region outside each of the storage capacitors 70, and the lower electrode 71 is connected to the upper layer through the contact hole 882 in a roundabout manner using the relay electrode 719 below the contact hole, even in the case where the lower electrode 71 is connected to the corresponding pixel electrode 9a above the lower electrode, it is riot necessary that the lower electrode 71 is formed to be wider than the dielectric film 75 and the capacitor electrode 300. Therefore, an etching process can simultaneously pattern the lower electrode 71, the dielectric film 75, and the capacitor electrode 300. As a result, each of etching rates of the lower electrode 71, the dielectric film 75, and the capacitor electrode 300 are easily controlled, so that the degree of freedom in design for film thickness, etc. can be increased.

In addition, since the dielectric film 75 is provided to have the same shape as those of the lower electrode 71 and the capacitor electrodes 300 and it has no spreading, in case of performing a hydrogenation process on the semiconductor layer 1a of each of the TFTs 30, it is possible to obtain the function and effect that hydrogen used in the process can easily reach-the semiconductor layer 1a through the openings around each of the storage capacitors 70.

In addition, a sintering process at about 1000° C. may be performed on the first interlayer insulating film 41, whereby ions, which are implanted into the polysilicon film constituting the semiconductor layer 1a or the gate electrode 3a, can be activated.

Each of the data lines 6a is formed on the fourth layer. Each of the data lines 6a is formed in a stripe shape to correspond in the direction along which the corresponding semiconductor layer 1a of each of the TFTs 30 is extended, that is, to overlap the Y direction in FIG. 6. As shown in FIG. 5, each of the data lines 6a is made of a film having a three-layer structure composed of an aluminum layer (see reference number 41A in FIG. 5), a titan nitride layer (see reference number 41TN in FIG. 5), and a silicon nitride film layer (see reference number 401 in FIG. 5) in this order from the bottom layer.

The silicon nitride film is patterned in a slightly larger size in order to cover the aluminum layer and the titan nitride layer below the silicon nitride film. Moreover, the data lines 6a is made up of aluminum that is a relatively low-resistance material, whereby the image signals can be efficiently supplied to the TFTs 30, in particular, the pixel electrodes 9a. On the other hand, since the silicon nitride film which has a relatively excellent function of reducing or preventing water from permeating the data lines 6a is provided on the data line 6a, a moisture-proof property of the TFTs 30 can be improved, and thus, it is possible to lengthen the life time of the TFTs. It is preferable that the silicon nitride film be a plasma silicon nitride film.

In addition, on the fourth layer, a relay layer 6a1 for a shield layer and second relay electrode 6a2 are provided as the same film as each of the data lines 6a. As shown in FIG. 6, they are not formed in a continuous plane shape with respect to each of the data lines 6a, but both are formed to be separated in patterns. In other words, if the data line 6a located at the leftmost of FIG. 6 is considered, the relay layer 6a1 for a shield layer having an approximate rectangular shape is provided at the right side of the data line, and the second relay electrode 6a2 having an approximate rectangular shape of which the area is larger than that of the relay layer 6a1 for a shield layer is provided at the right side of the relay layer 6a1. The relay layer 6a1 for a shield layer and the second relay electrode 6a2 are formed with the same process as the data lines 6a to be made of films having a three-layered structure of an aluminum layer, a titan nitride layer, and a plasma nitride film layer in this order from the bottom layer.

The plasma nitride film is patterned in a slightly larger size in order to cover the aluminum layer and the titan nitride layer below the plasma nitride film. The titan nitride layer functions as a barrier metal for reducing or preventing an etching piercing of contact holes 803, 804 which are provided to a relay layer 6a1 for a shield layer and the second relay electrode 6a2, respectively.

In addition, the plasma nitride film having a relatively excellent function of reducing or preventing water from permeating is formed on the relay layer 6a1 for a shield layer and the second relay electrode 6a2, so that the moisture-proof property of the TFTs 30 can be enhanced, and thus, it is possible to lengthen the life time of the TFTs. It is preferable that the plasma nitride film be a plasma silicon nitride film.

Above each of the storage capacitors 70 and below each of the data lines 6a, a silicate glass film, such as NSG, PSG, BSG, BPSG, a silicon nitride film, a silicon oxide film, or more preferably, a second interlayer insulating film 42 formed by a plasma CVD method using a TEOS gas, is provided. On the second interlayer insulating film 42, the contact hole 81 which electrically connects the heavily doped source region 1d of each of the TFTs 30 and the corresponding data line 6a is opened and the contact hole 801 which electrically connects the relay layer 6a1 for a shield layer and the capacitor electrode 300 which is the upper electrode of the corresponding storage capacitor 70 is opened. In addition, on the second interlayer insulating film 42, the contact hole 882, which electrically connects the second relay electrode 6a2 and the relay electrode 719, is provided.

On the fifth layer, the shield layers 400 are provided. As shown in FIGS. 6 and 7, the shield layers 400 are disposed in a lattice shape as viewed in a plane to be extended along the X and Y directions in the figures, respectively. In each of the shield layers 400, a portion, which is extended along the Y direction in the figures, is formed to be wider than the corresponding data line 6a, in particular, to cover the data line 6a. In addition, a portion, which is extended in the X direction in the figures, has a notch at the approximate center of one side of the corresponding pixel electrode 9a in order to ensure a region to form the described-later third relay electrode 402.

In addition, in FIGS. 6 and 7, in corner portions of the intersections of the shield layers 400 which extends in the X and Y directions, respectively, approximate triangular parts are provided to be buried in the respective corner portions. Since the approximate triangular parts are formed on the shield layers 400, light shielding for the semiconductor layers 1a of the TFTs 30 can be effectively performed. In other words, light components incident on the semiconductor layers 1a from the upward-slanted direction are absorbed or reflected by the triangular parts, so that the light components cannot reach the semiconductor layers 1a. Accordingly, the occurrence of light leakage current is suppressed, so that image display having a high quality can be implemented without any flicker, etc.

The shield layers 400 extend from the image display regions 10a, on which the pixel electrodes 9a are disposed, to peripherals thereof and are electrically connected to a constant potential source, thereby being kept at a fixed potential. In addition, the constant potential source may be the constant potential source of a positive power source or a negative power source from which power is supplied to a data line driving circuit 101, described later, and moreover it may be a constant potential source from which power is supplied to the counter electrodes 21 on the counter substrate 20.

In this way, since the entire data lines 6a are covered (see FIG. 7) and the shield layers 400 are kept at the fixed potential, it is possible to eliminate the influence of capacitance coupling which occurs between the data lines 6a and the pixel electrodes 9a. Namely, the change of the potential of the pixel electrodes 9a can be reduced or prevented in advance by the electrical conduction to the data lines 6a, so that it is possible to reduce the probability of the occurrence of display non-uniformity involved in the data lines 6a on the image. Since the shield layers 400 are provided in a lattice shape, it is possible to suppress and prevent the occurrence of unnecessary capacitance couplings at the portions to which the scan lines 11a extends.

In addition, a third relay electrode 402, as a relay layer, which is the same film as the shield layer 400, is formed on the fourth layer. The third relay electrode 402 has a function of electrically connecting the second relay electrode 6a2 and the pixel electrode 9a through a contact hole 89 which will be described later. In addition, the shield layer 400 and the third relay electrode 402 are not continuously formed in a plane shape, but both are formed and separated in patterns.

On the other hand, the aforementioned shield layer 400 and the third relay electrode 402 have a two-layered structure in which an aluminum layer is formed below the shield layer and the third relay electrode and a titan nitride layer are provided above the shield layer and the third relay electrode. In addition, in the third relay electrode 402, the aluminum layer below the third relay electrode is connected to the second relay electrode 6a2 and the titan nitride layer above the third relay electrode is connected to the corresponding pixel electrode 9a, which is made of ITO, etc. In the case where aluminum and the ITO are directly connected to each other, electrical erosion occurs between them. Therefore, due to the disconnection of aluminum or insulation resulting from the occurrence of alumina, a desirable electrical connection cannot be implemented. However, in the exemplary embodiment, since titan nitride and the ITO are connected, the contact resistance is low and an excellent connection can be obtained.

In this way, since an excellent electrical connection of the third relay electrode 402 and the corresponding pixel electrode 9a is implemented, a voltage applied to each of the pixel electrodes 9a or the potential holding characteristics of each of the pixel electrodes 9a can be excellently maintained.

In addition, since the shield layer 400 and the third relay electrode 402, which are made of aluminum of which the light reflective property is relatively good and titan nitride of which the light absorbing property is relatively good, can function as light-shielding layers. In other words, by the shield layer and the third relay electrodes, progress of the incident light (see FIG. 5) to the semiconductor layer 1a of TFT 30 can be shielded at the upper sides thereof. Similarly, the light-shielding function can be exerted on each of the capacitor electrodes 300 and each of the data lines 6a that are described above. The shield layer 400, the third relay electrode 402, the capacitor electrode 300, and the data line 6a, which constitute some portions of the laminated structure formed on the TFT substrate 10, function as an upper light-shielding film to shield light components incident to each of the TFTs 30 from the upper side thereof.

Above each of the data lines 6a and below each of the shield layers 400, the third interlayer insulating film 43, which is made of, for example, a silicate glass film, such as NSG, PSG, BSG, BPSG, a silicon nitride film, a silicon oxide film, or more preferably, a film formed by a plasma CVD method using a TEOS gas, is provided. On the third interlayer insulating film 43, the contact hole 803 which electrically connects the shield layer 400 and the relay layer 6a1 for a shield layer and the contact hole 804 which electrically connects the third relay electrode 402 and the second relay electrode 6a2 are opened, respectively.

Furthermore, with respect to the second interlayer insulating film 42, the aforementioned sintering process is not performed on the first interlayer insulating film 41, and as a result, the stress, which occurs at the vicinity of the boundary surface of the capacitor electrodes 300, may be lessened.

On the sixth layer, as described above, the pixel electrodes 9a are provided in a matrix shape, and an alignment film 16 is formed on the pixel electrodes 9a. In addition, below each of the pixel electrodes 9a, a silicate glass film, such as NSG, PSG, BSG, BPSG, a silicon nitride film, a silicon oxide film, or more preferably, the fourth interlayer insulating film 44 made up of the BPSG, is provided. On the fourth interlayer insulating film 44, the contact hole 89, which electrically connects the corresponding pixel electrode 9a and the third relay electrode 402, is opened. In the exemplary embodiment, the surface of the fourth interlayer insulating film 44 is planarized by a CMP (Chemical Mechanical Polishing) process, etc., so the alignment failure of the liquid crystal layers 50, which results from the step difference due to the various kinds of wiring or elements which exist below the fourth interlayer insulating film, can be reduced.

Furthermore, although each of the storage capacitors 70 is constructed in the three-layered structure of the pixel potential capacitor electrode, the dielectric film, and the fixed potential capacitor electrode in this order from the bottom layer, it may be constructed in the reverse structure.

In addition, as shown in FIGS. 2 and 3, the light-shielding films 53 are formed on the counter substrate 20 as frames to partition the respective image display regions. Over the entire surface of the counter substrate 20, transparent conductive films made of ITO, etc., are provided as the counter electrodes 21, and over the entire surfaces of the counter electrodes 21, the alignment film 22 made of a polyimide is provided. The alignment film 22 is subjected to a rubbing process in a predetermined direction in order to give the liquid crystal molecules a predetermined pre-tilted angle.

On a region outside the light-shielding film 53, the seal member 52 for sealing the liquid crystal is provided between the TFT substrate 10 and the counter substrate 20. The seal member 52 is disposed to have a shape which corresponds approximately to the contour of the counter substrate 20 and to fix the TFT substrate 10 and the counter substrate 20 to each other.

With respect to the seal member 52, a portion of one side of the TFT substrate 10 is cut, and a liquid crystal injection opening 108 to inject the liquid crystal 50 is provided at the gap between the bonded TFT substrate 10 and counter substrate 20. After the liquid crystal is injected through the liquid crystal injection opening 108, the liquid crystal injection opening 108 is sealed with a sealing material 109.

Outside the seal member 52, a data line driving circuit 101 for driving the data lines 6a by supplying the image signals to the data lines 6a at a predetermined timing and external circuit connection terminals 102 to connect to external circuits are provided along one side of the TFT substrate 10. Along two sides adjacent to the one side, a scan line driving circuits 104 to drive the gate electrodes 3a by supplying the scan signals to the scan lines 11a and the gate electrode 3a at a predetermined timing is provided. The scan line driving circuit 104 is provided at a location facing the light-shielding film 53 inside of the seal member 52 on the TFT substrate 10. In addition, on the TFT substrate 10, wires 105 which connects the data line driving circuit 101, the scan line driving circuit 104, the external circuit connection terminals 102, and the up-down conduction terminals 107 are provided to face the three sides of the light-shielding film 53.

The up-down conduction terminals 107 are provided at the four positions corresponding to the corner portion of the seal member 52 on the TFT substrate 10. In addition, up-down conduction members 106 whose lower ends are in contact with the up-down conduction terminals 107 and whose upper ends are in contact with the counter electrodes 21 are provided between the TFT substrate 10 and the counter substrate 20, and electrical conduction between the TFT substrate 10 and the counter substrate 20 can be obtained by the up-down conduction members 106.

With respect to the two-dimensional and three-dimensional layouts of each component, the present invention is not limited to the exemplary embodiment, but various types thereof can be considered.

In FIG. 1, the left side illustrates some of film formation patterns of a plurality of film formation layers of the pixel regions, and the right side illustrates some of the film formation patterns of the test element formation region. Although FIG. 1, for the sake of a simplified description, illustrates the film formation layers in the pixel region and the film formation layers in the test element formation region irrespective of the structure of FIG. 5, it is apparent that the test element formation region can be constructed even in accordance with FIG. 5. In FIG. 1, a film formation pattern P5 in the pixel region to acquire the characteristics is considered to be the uppermost film formation layer. A test element pattern T5 in the test element formation region is provided to correspond to the film formation pattern P5. In addition, at both ends of the test element pattern T5, a pair of pads 111, 112 for a measurement are provided. In the exemplary embodiment, below the pair of pads 111, 112, dummy patterns D2, D4 are provided with the same film as that of the film formation patterns P2, P4 in the pixel region. In addition, the film formation patterns formed below the pads may preferably define the vertical locations of the pads, and even arbitrary pattern shapes themselves may be preferable.

An interlayer insulating film 113 formed on the film formation layer on which the pads 111, 112 are formed is removed at the corresponding portions of the pads 111, 112, whereby openings 114, 115 are formed. A pin of a measuring instrument (not shown) is connected to the pair of pads 111, 112 through the openings 114, 115, so that the characteristics of the test element pattern T5 can be measured and the characteristics of the film formation pattern P5 or the elements in the pixel region can be estimated.

Manufacturing Process

Figure 10:
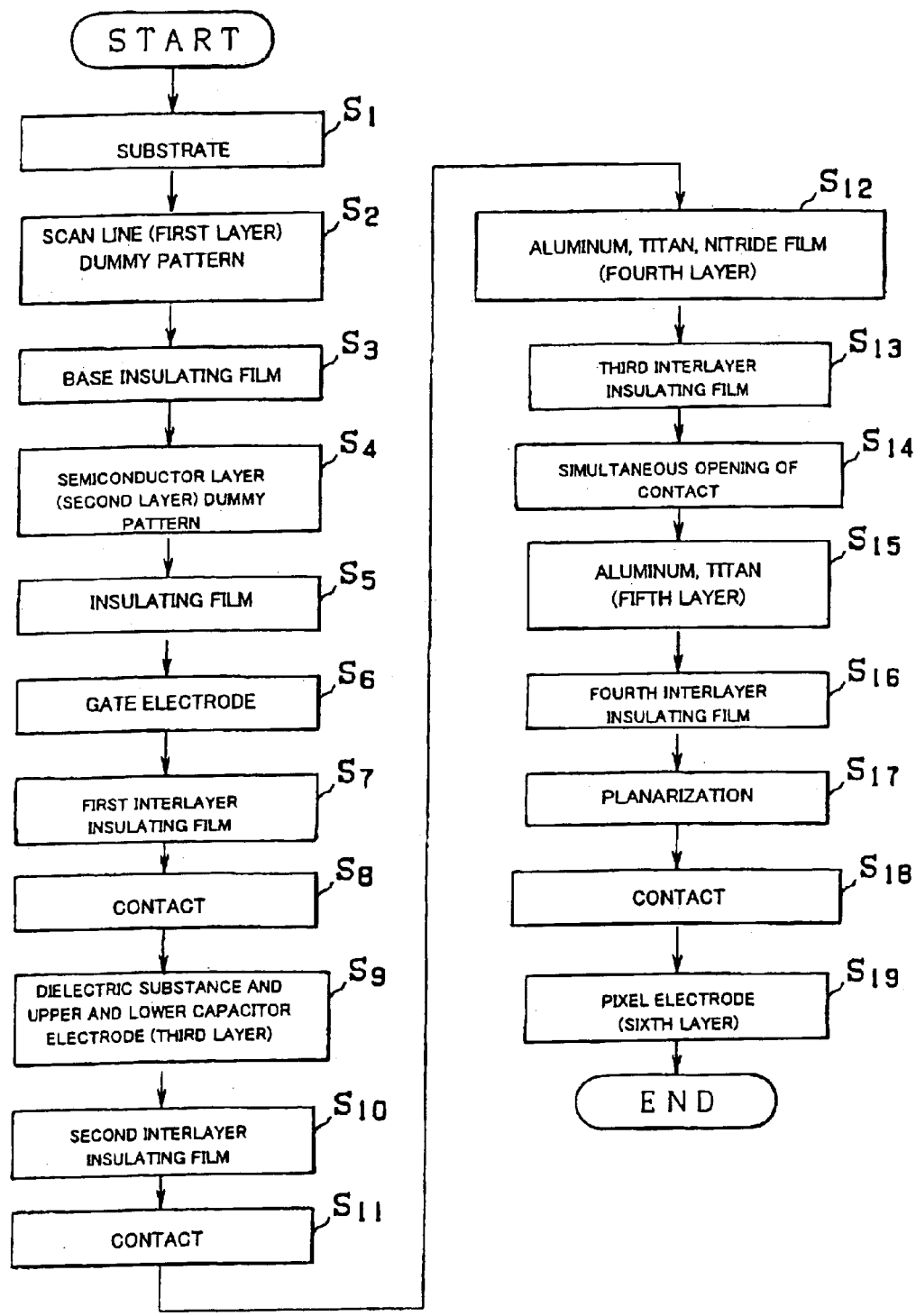
FIG. 10 is a flow chart illustrating a method of manufacturing a test element formation region.

Next, a method of manufacturing a liquid crystal device according to the present exemplary embodiment will be described with reference to FIGS. 1 and 8 to 10. FIG. 1 illustrates a cross-sectional structure of a test element formation region which is formed at a location outside a pixel region, FIGS. 8 and 9 illustrate manufacturing processes in the pixel region in the process sequence, and FIG. 10 is a flow chart illustrating the method of manufacturing. In addition, the test element patterns to detect the characteristics of the respective elements are provided at the different horizontal locations.

Although each of the film formation layers in FIG. 1 has no relation to FIG. 5, for the sake of convenience of description, the film formation layers P1 to P5 in FIG. 1 are considered to correspond to the first layer to the fifth film formation layer in FIG. 5, respectively. Namely, the indexes of reference numerals P1 to P5, D1 to D4, T5 in FIG. 1 are considered to correspond to those of the respective film formation layers in FIG. 5. It is assumed that, in region A in FIG. 1, the film formation patterns P2, P4, P5 are formed in the second, fourth, and fifth layers, in this order from the bottom layer, respectively, and in region B in FIG. 1, the first to fourth layers are formed in this order from the bottom layer. In addition, in this case, it is considered that sheet resistance of the shield layer 400 which is a film formation layer in the fifth layer is measured and the pads 111, 112 are formed at both ends of the test element pattern T5 to correspond to the shield layer 400.

First, as shown in a process (1) in FIG. 8, the TFT substrate 10 made of a quartz substrate, a glass substrate, a silicon substrate, or the like is prepared (step S1 in FIG. 10). Herein, the TFT substrate 10 is preferably subjected to a previous processing to perform an annealing process at a high temperature of about 900 to 1300° C. under an inert gas ambient, such as N (nitrogen) in order to reduce the deformation created on the TFT substrate 10 in an afterwardly-performed high temperature process.

Next, a metal alloy film made up of a metal or a metal silicide containing Ti, Cr, W, Ta, Mo, etc., are deposited in a film thickness of 100 to 500 nm, or preferably 200 nm by a sputtering process over the entire surface of the processed TFT substrate 10. Hereinafter, the film before a patterning process is referred to as a precursor film. And then, a photolithography process and an etching process pattern the precursor film made of the metal alloy film, whereby each of the scan lines 11a of which the planar shape is a stripe shape is formed (step S2)

Next, on the scan lines 11a, a base insulating film 12, which is made of a silicate glass film, such as NSG (Non-Silicate Glass), PSG (Phosphorus Silicate Glass), BSG (Boron Silicate Glass), and BPSG (Boron Phosphorus Silicate Glass), a silicon nitride film, a silicon oxide film, or the like, is formed by a normal pressure CVD method or a low pressure CVD method, for example, using a TEOS (tetra ethyl ortho silicate) gas, a TEB (tetra ethyl borate) gas, a TMOP (tetra methyl oxy phosrate) gas, or the like (step S3). The film thickness of the base insulating film 12 is, for example, about 500 to 2000 nm.

In the next step S4, the semiconductor layer 1a in the second layer is formed. A precursor film of the semiconductor layer 1a is an amorphous silicon film which is formed on the base insulating film 12 by the low pressure CVD method (for example, a CVD method at a pressure of about 20 to 40 Pa) using a monosilane gas, disilane gas, or the like at a flow rate of about 400 to 600 cc/min at a relatively low temperature ambient of about 450 to 550° C., or preferably 500° C. Next, a p-Si (polysilicon) film is grown in a solid phase up to its thickness of about 50 to 200 nm, or preferably about 100 nm by a thermal process under nitrogen ambient at a temperature of about 600 to 700° C. for about 1 to 10 hours, or preferably 4 to 6 hours. The method for the solid phase growth may be an annealing process using RTA or a laser annealing process using an excimer laser. At this time, dopants of a V group element or a III group element may be lightly doped by an ion implantation method, or the like depending on types of the pixel switching TFT 30, that is, n channel type or p channel type. In addition, the semiconductor layer 1a having a predetermined pattern is formed by a photography process and an etching process.

In the exemplary embodiment, at the time of forming the film formation pattern P2 in the second layer, the dummy pattern D2 is formed in the test element formation region with the same film formation material as that of the second layer. The dummy pattern D2 is formed at the time of forming the portions in the second layer corresponding to the pads 111, 112 at both ends of the test element pattern.

Next, in the step S5, as shown in the process (2) in FIG. 8, an lower gate insulating film is formed by performing a thermal oxidation process on the semiconductor layer 1a constituting the TFT 30 at a temperature of about 900 to 1300° C., or preferably about 1000° C., and in some cases, subsequently an upper gate insulating film is further formed by a low pressure CVD method, whereby an insulating film 2 (including a gate insulating film) made of a single-layered or multi-layered structure of a high temperature silicon oxide film (HTO film) or a silicon nitride film is formed. As a result, the semiconductor layer 1a has a thickness of about 30 to 150 nm, or preferably about 35 to 50 nm, and the insulating film 2 has a thickness of about 20 to 150 nm, or preferably about 30 to 100 nm.

Next, in order to control a threshold voltage Vth of the pixel switching TFT 30, a predetermined amount of dopants, such as boron, etc. are doped on the n channel region or the p channel region of the semiconductor layer 1a by an ion implantation method, or the like.

Next, on the base insulating film 12, a groove 12cv connected to the scan line 11a is formed. A dry etching method, such as a reactive ion etching method and a reactive ion beam etching method, or the like forms the groove 12cv.

Next, as shown in a process (3) in FIG. 8, a polysilicon film is deposited by a low pressure CVD method or the like, and the polysilicon film becomes conductive by a thermal diffusion of phosphorus (P). Instead of the thermal diffusion, a doped silicon film to which P ions are introduced at the same time of forming the polysilicon film may be used. The polysilicon film has a thickness of about 100 to 500 nm, or preferably about 350 nm. In addition, by a photolithography process or an etching process, a predetermined pattern of a gate electrode 3a including a gate electrode portion of the TFT 30 is formed (step S6). At the time of forming the gate electrode 3a, a sidewall 3b connected thereto is also simultaneously formed. The sidewall 3b is formed by depositing the aforementioned polysilicon film inside the groove 12cv. At this time, a bottom of the groove 12cv is in contact with the scan line 11a, whereby the sidewall 3b and the scan line 11a are electrically connected. In addition, at the same time of patterning the gate electrode 3a, a relay electrode 719 is also formed. By this patterning process, the relay electrode 719 is shaped to have the planar shape as shown in FIG. 6.

Next, on the semiconductor layer 1a, a lightly doped source region 1b, a lightly doped drain region 1c, a heavily doped source region 1d, and a heavily doped drain region 1e are formed.

Herein, only the case in which the TFT 30 is the n channel TFT having an LDD structure is described. Specifically, at first, dopants of a V group element, such as P, are doped at a low concentration (for example, at a dose amount of P ions of 1 to $3\times10^{13}/\text{cm}^2$) by using the gate electrode 3a as a mask in order to form the lightly doped source region 1b and the lightly doped drain region 1c. As a result, the semiconductor layer 1a below the gate electrode 3a becomes a channel region 1a'. At this time, since the gate electrode 3a functions as a mask, the lightly doped source region 1b and the lightly doped drain region 1c are formed in a self-aligned manner. Next, a resist layer having a wider planar pattern than the gate electrode 3a is formed on the gate electrode 3a in order to form the heavily doped source region 1d and the heavily doped drain region 1e. After that, dopants of a V group element, such as P, are doped at a high concentration (for example, at a dose amount of P ions of 1 to $3\times10^{15}/\text{cm}^2$).

In addition, the doping process may be performed without the separation of two steps, such as the low and high concentration steps. For example, without performing the low concentration doping step, the TFT may be an off set-structure TFT or a self-aligned TFT which is formed by an ion implantation technique using P ions, B ions, etc., and the gate electrode 3a as a mask. By the doping of these impurities, the gate electrode 3a has a still lower resistance.

In the exemplary embodiment, in the process of forming the second layer, predetermined dummy patterns D2 are formed in the test element formation region by using a film formation material of the second layer. The dummy patterns D2 are formed below the locations of the pads 111, 112 of the test element pattern, which is expected to be formed. The dummy patterns D2 control the vertical locations of the pads 111, 112, and thus, they may be formed with two separated patterns, as shown in FIG. 1, or with a continuous single pattern.

Next, as shown in a process (4) in FIG. 8, on the gate electrode 3a, the first interlayer insulating film 41, which is made of, for example, a silicate glass film, such as NSG, PSG, BSG, or BPSG, a silicon nitride film, or a silicon oxide film, is provided by a normal pressure CVD method or a low pressure CVD method using a TEOS gas, a TEB gas, a TMOP gas, or the like (step S7). The first interlayer insulating film 41 has a thickness of, for example, about 500 to 2000 nm. Herein, an annealing process is preferably performed at a high temperature of about 800° C. to enhance the film quality of the first interlayer film 41.

Next, in the step S8, a contact hole 83 and a contact hole 881 are opened on the first interlayer insulating film 41 by a dry etching method, such as a reactive ion etching method, a reactive ion beam etching method, or the like. At this time, the former is formed and connected to the heavily doped drain region 1e of the semiconductor layer 1a and the later is formed to be connected to the relay electrode 719.

Next, in the step S9, as shown in the process (5) in FIG. 8, a conductive polysilicon film or a metal film made of Pt, etc. is formed on the first interlayer insulating film 41 to have a film thickness of about 100 to 500 nm by a low pressure CVD method or a sputtering method, whereby a precursor film of the lower electrode 71 is formed to have a predetermined pattern. In this case, the film formation of the metal film is performed to fill both of the contact hole 83 and the contact hole 881, whereby the heavily doped drain region 1e and the relay electrode 719 can be electrically connected to the lower electrode 71.

Next, a precursor film of the dielectric film 75 is formed on the lower electrode 71. The dielectric film 75 can be formed by various well-known techniques generally used to form a TFT gate insulating film, similar to the case of the insulating film 2. A silicon oxide film 75a is formed by the aforementioned thermal oxidation method, a CVD method, or the like, and then, a silicon nitride film 75b is formed by a low pressure CVD method, or the like. Since the thinner dielectric film 75 leads to the lager capacitance of the storage capacitor 70, it is preferable that the dielectric film be formed as an excessively thin insulating film having a thickness of 50 nm or less under the condition that failure, such as a film breakage is not generated. Next, a conductive polysilicon film or a metal film made up of Al (aluminum) is formed on the dielectric film 75 to have a film thickness of about 100 to 500 nm by a low pressure CVD method or a sputtering method, whereby a precursor film of the capacitor electrode 300 is formed.

Next, in the process (6) in FIG. 9, the precursor films of the lower electrode 71, the dielectric film 75, the capacitor electrode 300 are patterned at one time to form the lower electrode 71, the dielectric film 75, the capacitor electrode 300, whereby the storage capacitor 70 is completed.

Next, as shown in the process (7) in FIG. 9, the second interlayer insulating film 42, which is made of a silicate glass film, such as NSG, PSG, BSG, or BPSG, a silicon nitride film, a silicon oxide film, or the like, is formed by a normal pressure CVD method or a low pressure CVD method using a TEOS gas, etc., or preferably a LPCVD method (step S10). In the case where aluminum is used for the capacitor electrode 300, a low temperature film formation using plasma CVD method is needed. The second interlayer insulating film 42 has a thickness of, for example, about 500 to 1500 nm. In addition, each of the interlayer insulating films including the second interlayer insulating film 42 is also deposited on the test element formation region.

Next, in the step S11, contact holes 81, 801, and 882 are opened on the second interlayer insulating film 42 by a dry etching method, such as a reactive ion etching method, a reactive ion beam etching method, or the like. At this time, the contact hole 81, the contact hole 801, and the contact hole 882 are formed and connected to the heavily doped source region 1d of the semiconductor layer 1a, the capacitor electrode 300, and the relay electrode 719, respectively.

Next, in the step S12, as shown in the process (8) in FIG. 9, a metal film made of a low-resistance metal, such as aluminum, having a light shielding property or a metal silicide which constitutes the fourth layer is deposited to have a thickness of about 100 to 500 nm, or preferably about 300 nm over the entire surface of the second interlayer insulating film 42 by a sputtering method, or the like. And then, the data line 6a having a predetermined pattern is formed by a photolithography method or an etching method. At the same time of performing the aforementioned patterning process, the relay layer 6a1 for a shield layer and the second relay layer 6a2 are also formed. The relay layer 6a1 for a shield layer is formed to cover the contact hole 801, and at the same time, the second relay layer 6a2 is formed to cover the contact hole 882.

Next, on the entire surface of an upper layer of these layers, a titan nitride film made up of titan nitride is formed by a plasma CVD method, and then a patterning process is performed to keep the film only on the data line 6a (see reference numeral 41TN in the process (8) in FIG. 9). However, the film made up of titan nitride may also be formed to be kept on the relay layer 6a1 for a shield layer and the second relay layer 6a2, and in some case, it may be formed to be kept on the entire surface of the TFT substrate 10. In addition, it may be formed at one time and at same time of forming the film of aluminum and it may be performed by an etching.

In the process of forming the data line 6a on the fourth layer, the same material as that of the data line 6a is also patterned on the test element formation region, whereby dummy patterns D4 are formed above the dummy patterns D2. Each of the dummy patterns D4 is constructed with the lowermost layer of aluminum, the intermediate layer of titan nitride, and the uppermost layer of silicon nitride, which are made of the same material as that of the data line 6a, and has the same thickness as that of the data line 6a. In addition, the dummy patterns D4 may also be formed with two separated patterns above the respective dummy patterns D2 or with a single pattern.

Next, as shown in the process (9) in FIG. 9, the third interlayer insulating film 43, which is made of a silicate glass film, such as NSG, PSG, BSG, or BPSG, a silicon nitride film, a silicon oxide film, or the like, is formed to cover upper portions of the data line 6*a*, etc. by a normal pressure CVD method or a low pressure CVD method using a TEOS gas, etc., or preferably a plasma CVD method by which a low temperature film formation can be performed (step S13). The third interlayer insulating film 43 has a thickness of, for example, about 500 to 3500 nm.

Next, in the step S14, contact holes 803 and 804 are opened on the third interlayer insulating film 43 by a dry etching method, such as a reactive ion etching method, a reactive ion beam etching method, or the like. At this time, the contact hole 803 and the contact hole 804 are formed and connected to the aforementioned relay layer 6*a*1 for a shield layer and the second relay layer 6*a*2, respectively.

Next, in the step S15, on the third interlayer insulating film 43, the shield layer 400 of the fifth layer is formed by a sputtering method or plasma CVD method.

First, above the third interlayer insulating film 43, a lower layer film is formed with a low-resistance material, such as, for example, aluminum; after that, on the lower layer film, a upper layer film is formed with, for example, titan nitride or other materials which does not create electrical erosion of ITO constituting the pixel electrode 9*a*, which will be described later, and finally, the lower layer film and the upper layer film are patterned together, whereby the shield layer 400 having a two-layered structure is formed. At this time, in addition to the shield layer 400, the third relay electrode 402 is also formed.

In the exemplary embodiment, in the test element formation region, a predetermined test element pattern T5 is formed in order to obtain a sheet resistance of the shield layer 400, for example, by using the same material as that of the shield layer 400 of the fifth layer. The shield layer 400 includes a lower layer of aluminum-and an upper layer of titan nitride, and these wiring materials are also used to form the test element pattern T5. In addition, in this case, the vertical locations (depths from the surface of the device) of the portions, where the pads 111, 112 at both ends of the test element pattern T5 are formed, are equalized to each other by being defined with the dummy patterns D2, D4 and the film thicknesses of the interlayer insulating films, and they also are equalized to a vertical location of the shield layer 400 of the pixel region.

Next, the fourth interlayer insulating film 44, which is made of a silicate glass film, such as NSG, PSG, BSG, BPSG or the like, a silicon nitride film, a silicon oxide film, or the like, is formed by a normal pressure CVD method or a low pressure CVD method using a TEOS gas (step S16). The fourth interlayer insulating film 44 has a thickness of, for example, about 500 to 1500 nm.

Next, in the step S17, as shown in FIG. 5, the fourth interlayer insulating film 44 is planarized by using a CMP process, for example. And then, a contact hole 89 is opened on the fourth interlayer insulating film 44 by a dry etching method, such as a reactive ion etching method, a reactive ion beam etching method, or the like (step S18). At this time, the contact hole 89 is formed and connected to the third relay electrode 402, respectively.

In the exemplary embodiment, the interlayer insulating films on the test element pattern T5 formed in the step S1 6 are removed at the PAD portions 111, 112 at both ends at the same time of forming the contact hole 89, and the pads 111, 112 are upwardly exposed though the openings 114, 115, respectively.

In this case, by forming the dummy patterns D2, D4, the depths of the pads 111, 112 from the surface of the device are equalized. Therefore, the openings 114, 115 for exposing the respective pads 111, 112 can be simultaneously opened by the same etching process. In addition, since the depths of the pads 111, 112 and the depth of the shield layer 400 of the pixel region are equalized, the openings 114, 115 on the pads 111, 112 can be simultaneously opened together with the contact hole 89 by the etching process of the step S18.

Next, on the fourth interlayer insulating film 44, a transparent conductive film, such as ITO film is deposited to have a thickness of about 50 to 200 nm by a sputtering process method. And then, the pixel electrode 9*a* is formed by a photolithography method or an etching method (step S19).

In addition, in the case where the electro-optical device is used for reflective type one, the pixel electrode 9*a* may be formed with an opaque material, such as Al with a high reflectance. Next, an alignment film coating solution made up of polyimide is coated on the pixel electrode 9*a*, and then a rubbing process is performed to form a predetermined pre-tilted angle in a predetermined direction, whereby the alignment film 16 is formed.

On the other hand, with respect to the counter substrate 20, the glass substrate or the like is first prepared, light-shielding films 53, as a frame, are formed by sputtering a metal chromium, for example, and then by using a photolithography method or an etching method. In addition, each of the light-shielding films 53 is not necessarily conductive, and thus, it may be formed with a material, such as a resin black in which carbon or Ti is dispersed in a photoresist besides a metal material, such as Cr, Ni, Al, etc.

Next, on the entire surface of the counter substrate 20, transparent conductive films, such as an ITO film are deposited to have a thickness of about 50 to 200 nm by a sputtering method, whereby the counter electrodes 21 are formed. In addition, an alignment film coating solution made up of polyimide is coated on the entire surface of each of the counter electrode 21, and then a rubbing process is performed to form a predetermined pre-tilted angle in a predetermined direction, whereby the alignment film 22 is formed.

Finally, as shown in FIGS. 2 and 3, the TFT substrate 10 and the counter substrate 20, where each of the layers are formed, are bonded with the seal member 52, for example, by forming the seal member 52 along the four sides of the counter substrate 20, and at the same time by forming up-down conduction members 106 at the four corners of the seal member 52 to face the alignment films 16, 22 to each other. The up-down conduction members 106 have lower ends for contacting the up-down conduction terminals 107 of the TFT substrate 10 and upper ends for contacting the common electrodes 21 of the counter substrate 20, whereby electrical conduction between the TFT substrate 10 and the counter substrate 20 can be obtained. And then, liquid crystal which is made by, for example, mixing several kinds of nematic liquid crystal is sucked into the space between both of the substrates by a vacuum suction method, or the like, whereby a liquid crystal layer 50 having a predetermined thickness is formed.

The seal member 52 is made up of, for example, an ultra-violet curing resin or a thermosetting resin to attach both of the substrates together and are cured by ultra-violet irradiation, heating, or the like. Furthermore, if the liquid crystal device in the exemplary embodiments is applied to a small type liquid crystal device having the function of displaying images in high magnification power, such as a projector, gap materials (spacers), such as glass fibers glass beads or the like may be dispersed among the seal members 52, in order to keep the distance (gap between the substrates) between both substrates to be a predetermined value. In addition, if the liquid crystal device is applied to a large type liquid crystal device capable of displaying images in equal magnification power, such as a liquid crystal display or a liquid crystal TV, the gap materials may be preferably included among the liquid crystal layer 50.

In addition, as long as the delay of the scanning signals supplied to the scan lines 1 *a* and the gate electrodes 3*a* is not considered to be a problem, the scan line driving circuits 104 may also be provided at only one side. Furthermore, the data line driving circuits 101 may be disposed along both sides of each of the image display regions 10*a*.

In addition, on the TFT substrate 10, in addition to the aforementioned data line driving circuit 101, the scan line driving circuits 104, and the like, a sampling circuit to apply the image signals to the plurality of data lines 6*a* at a predetermined timing, a precharge circuit to supply precharge signals of a predetermined voltage level to the plurality of data lines 6*a* prior to the image signals, and an inspection circuit to inspect the quality, defects, etc., of the electro-optical device during the manufacturing stage or at the shipment stage may be provided.

In addition, in each of the aforementioned exemplary embodiments, instead of being formed on the TFT substrate 10, the data line driving circuit 101 and the scan line driving circuit 104 may be electrically and mechanically connected to a driving LSI mounted on a TAB (Tape Automated Bonding) substrate through an anisotropic conductive film formed on the surrounding region of the TFT substrate 10. In addition, at the side of the counter substrate 20 where emitting light is incident and-at the side of the TFT substrate 10 where the emitting light is emitted, the respective ones of a polarizing film, a phase-difference film, a polarizing plate, etc. are disposed in a predetermined direction in accordance with, for example, an operational mode, such as a TN (Twisted Nematic) mode, a VA (Vertically Aligned) mode, and a PDLC (Polymer Dispersed Liquid Crystal) mode, or a normally-white mode and a normally-black mode.

In this way, in the exemplary embodiment, below the portion for forming a pair of pads, which have the test element patterns formed on the test element formation region, the dummy patterns having a predetermined shape are formed with the same film formation materials as those of the pixel region. As a result, the depths of these pads can be equalized, and the contact holes to expose these pads can be opened by an etching process. In addition, the depths of the pads can be equalized to the depth of the film formation layer by which the characteristics of the pixel region is expected to be measured, and the contact hole on the pads can be simultaneously opened by the etching process to form the contact holes on the interlayer insulating films on the film formation layer.

In addition, the openings may be simultaneously opened on the pair of pads by an etching process, and otherwise, one of the pads may be cut out by a slightly over-etching. Namely, the vertical locations of the pair of pads may be different from each other in consideration of selection ration between the interlayer insulating films and pads and the thickness of the PAD, etc. Therefore, in the layers below the pair of pads, it is not necessary that the dummy patterns of the same film formation layers are formed, and it is apparent that the dummy patterns of the different film formation layers can be formed below the pair of pads. In addition, as long as the over-etching is in an allowable range, the vertical locations of the pair of pads may be provided to be different from each other.

In addition, in the same etching process as the etching process for interlayer insulating films of a certain film formation layer which is formed on the pixel region, it is necessary that the PAD portions of the test element formation region may be opened, and it is not necessary that the vertical locations of the pads and the film formation layer in the pixel region where the characteristics are expected to be measured are equalized. They may be approximately equalized so that all the contact holes of the pads can be simultaneously opened by an etching process in consideration of the over-etching margins.

In addition, although the aforementioned exemplary embodiment describes an example that the vertical locations of a pair of PAD are equalized to each other, the test element may be a pair of test pads, such as resistors or two-port elements, or three pads corresponding to the three terminals in such a test of a transistor, etc. Moreover, in the case of a complicated test circuit pattern, plural (three or more) pads may be needed. Although there is no doubt, the pads of the test element formation region according to an aspect of the present invention are not limited to a pair of pads, and the important requirement of the constructions is that the vertical locations of plural pads are equalized or substantially equalized between a series of pads.

Figure 12:
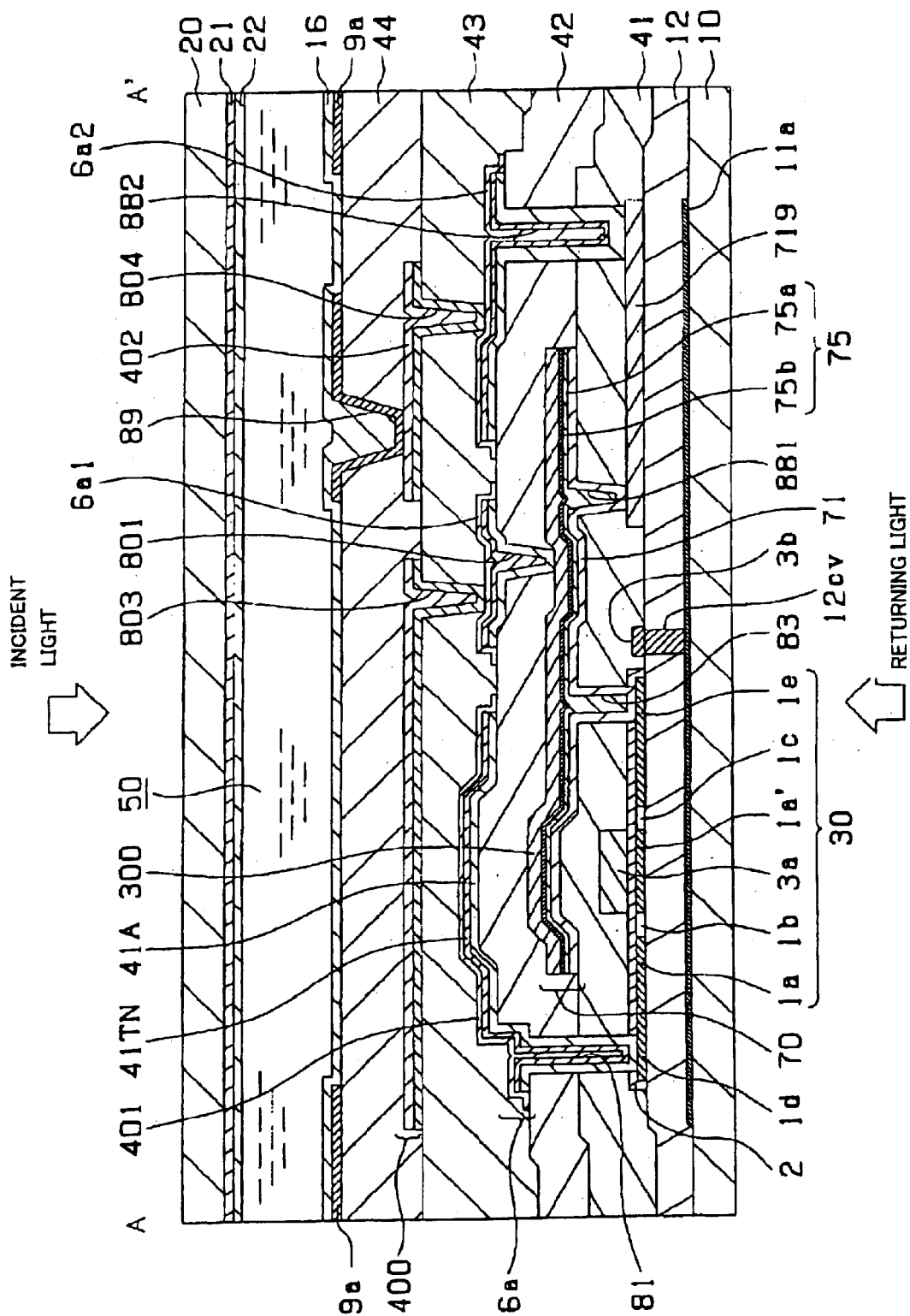
FIG. 12 is a cross-sectional view illustrating a structure of one pixel of a liquid crystal device constructed by using an element substrate having a plurality of planarized film formation layers in detail.

FIG. 11 is a view for explaining test element formation regions of a test-element-provided substrate according to a second exemplary embodiment of the present invention. FIG. 11(A) illustrates a cross-sectional structure and FIG. 11(B) illustrates a planar structure. In addition, FIG. 12 is a cross-sectional view illustrating a structure of one pixel of a liquid crystal device constructed by using an element substrate having a plurality of planarized film formation layers in detail.

In the first exemplary embodiment, an example to test the sheet resistance of the film formation layer in the pixel region has been described. In the exemplary embodiment, an example to test contact resistance of contact holes to connect the film formation layers in the pixel region will be described.

The exemplary embodiment is an example of using a substrate where, in addition to interlayer insulating films of the uppermost layer, the interlayer insulating films of the lower layers thereof are planarized. FIG. 12 illustrates an example where, in the liquid crystal device in FIG. 5, the third interlayer insulating film 43 as well as the fourth interlayer insulating film 44 is planarized.

As described above, in the case where a CMP process is not performed on the interlayer insulating films, the test element patterns of contact holes to measure the contact resistance may be formed at any of the vertical locations in the test element formation region without any problem. However, in a case where planarization is performed by the CMP process, the distance from the surface of the device in the pixel region to the wiring connected through the contact holes may be different from the distance from the surface of the device in the test element formation region to the wiring connected through the contact holes, so that a test of the contact resistance cannot be carried out.

Therefore, in the exemplary embodiment, the contact holes of the test element are formed at the same depth as the contact holes in the device with reference to the location of the surface of the device, whereby an accurate test of the contact resistance can be carried out.

FIG. 11 illustrates a cross-sectional structure of the test element formation region. As shown in FIG. 11, in the region D among the regions C to E in the test element formation region, dummy patterns D11 to D14 of the respective first to fourth layers and wiring pattern T15 of the wiring layer of the fifth layer from the bottom layer are laminated with interlayer insulating films being interposed among them. In addition, on the wiring pattern T15, an interlayer insulating film 120 is laminated and planarized, and on the interlayer insulating film 120, wiring patterns 121, 122 are formed. The wiring patterns 121, 122 are electrically connected to each other though a contact hole C16 that is formed by opening the planarized interlayer insulating film 120.

The wiring pattern T15 is a pattern corresponding to the wiring layer of the fifth layer of the pixel region. On the film formation patterns of the wiring layer of the fifth layer in the pixel region, an interlayer insulating film having the same thickness as that of the interlayer insulating film 120 is laminated, and on the interlayer insulating film, a wiring layer is formed. The wiring layer and the interlayer insulating film are electrically connected to each other through a contact hole, and contact resistance of the contact hole is the object of test in the exemplary embodiment.

In addition, below the wiring layer of the fifth layer in the pixel region, the film formation layers of the fourth layer to the first layer from the upper portion are formed. In the exemplary embodiment, below the wiring layer T15, the dummy patterns D1 to D4 are formed at the same film formation process as the first to fourth film formation layers in the pixel region. Therefore, the interlayer insulating film formed on the wiring layer of the fifth layer and the interlayer insulating film 120 in the test element formation region have the same thickness, and the contact hole C16 is formed with the same shape and dimension as the contact hole which is the object of test.

As a result, in the exemplary embodiment, the wring pattern T15 of the wiring layer has the same depth from the surface of the device as that of the wiring layer of the fifth layer in the pixel region. Therefore, the contact resistance of the contact hole C16 can be considered to be the same as the contact resistance of the contact hole formed on the interlayer insulating film of the wiring layer in the pixel region.

In addition, in the exemplary embodiment, it is necessary only that the depth of the contact hole in the pixel region be equalized to the depth of the contact hole associated with the test element patterns in the test element formation region, and it is not necessary to form the dummy patterns on the same film formation layer as the film formation layer formed below the contact hole in the pixel region. Moreover, it is also necessary only that the sum of the thicknesses of the dummy patterns be approximately equal to the sum of the thicknesses of the film formation layers formed below the contact hole in the pixel region.

Figure 13A:
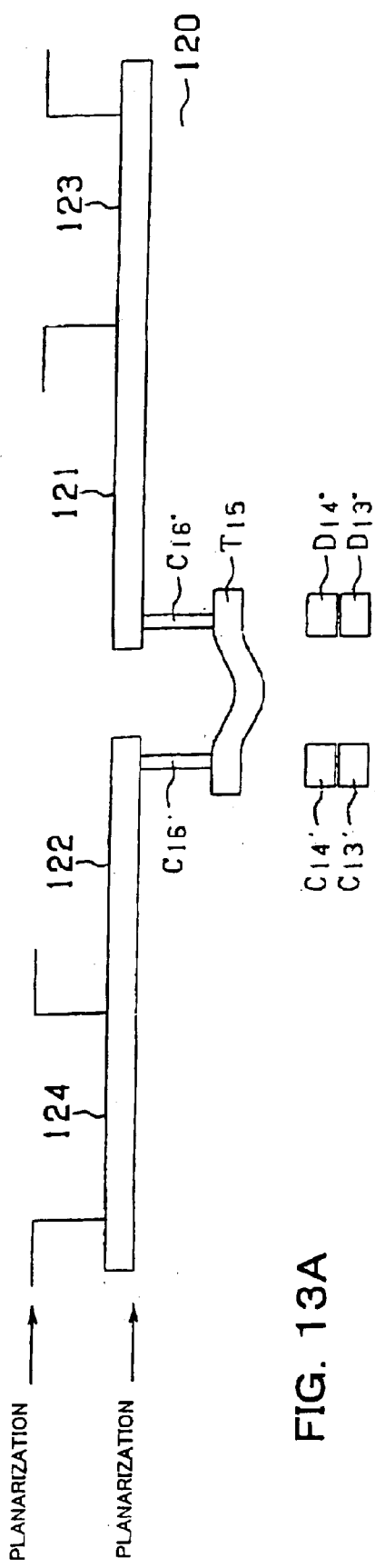
FIGS. 13(A) and 13(B) are views for explaining a modified example of the second exemplary embodiment.
Figure 13B:
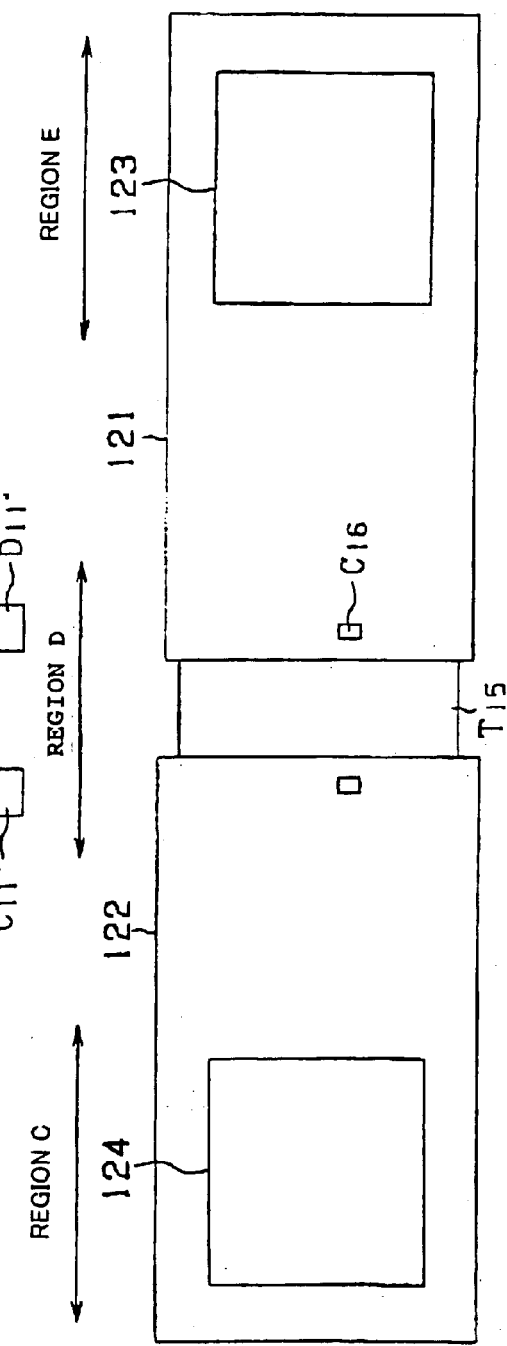

FIG. 13 is a view for explaining a modified example of the second exemplary embodiment in FIG. 11.

The modified example in FIG. 13 is an example that the dummy patterns D1 to D4 in FIG. 11 are divided into two dummy patterns D1', D1" to D4', D4", respectively. The dummy patterns D1' to D4' are formed below the wiring pattern T15 which is formed below the contact hole C16', and the dummy patterns D1" to D4" are formed below the wiring pattern T15 which is formed below the contact hole C16". The other constructions are the same as those of FIG. 11. Even in this case, the vertical locations of the contact holes can be equalized to the vertical locations of the corresponding contact-holes in the pixel region.

In the modified example, since the dummy patterns are formed to be small only below the contact holes, even in the case where a film formation material having a relatively large stress is used, it is possible to reduce or prevent cracks or the like from occurring.

The other constructions and functions are the same as those of the second exemplary embodiment in FIG. 11.

Figure 14A:
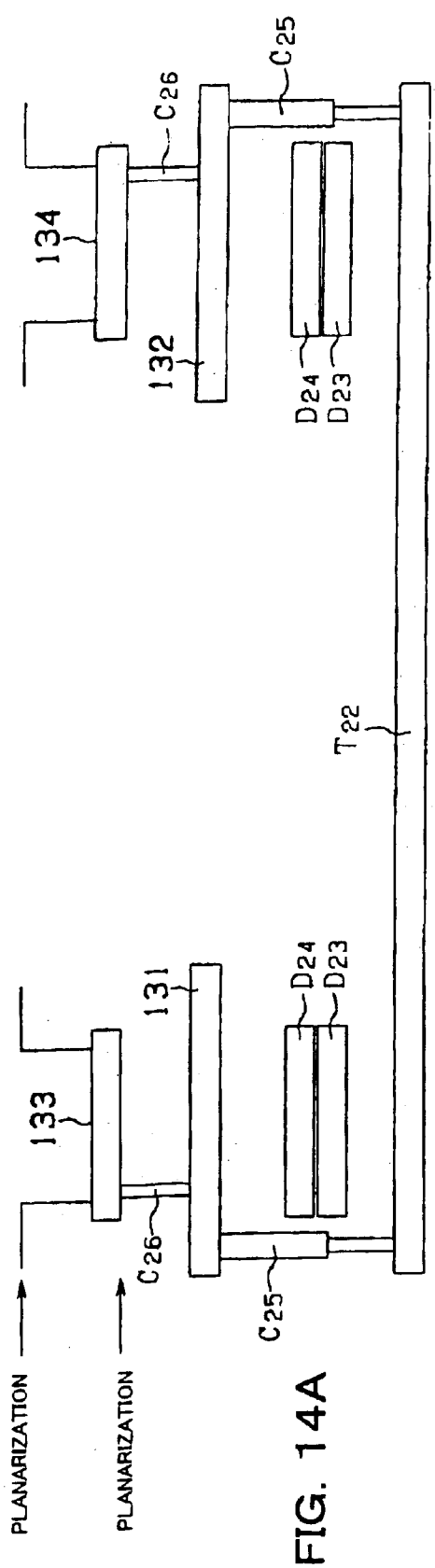
FIGS. 14(A) and 14(B) are views for explaining a third exemplary embodiment of the present invention.
Figure 14B:
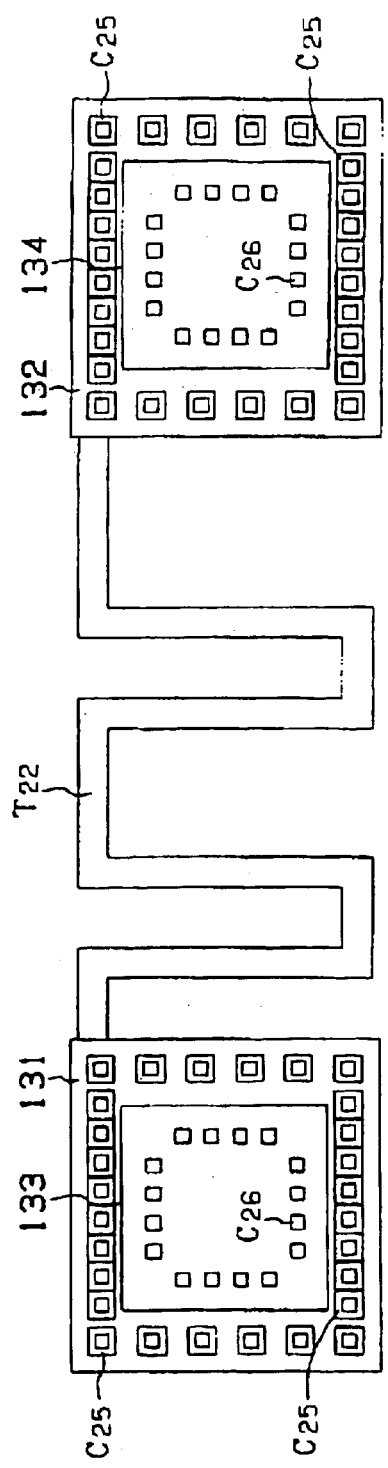

FIG. 14 is a view for explaining test element formation regions of a test-element-provided substrate according to a third exemplary embodiment of the present invention. FIG. 14(A) illustrates a cross-sectional structure and FIG. 14(B) illustrates a planar structure.

In the second exemplary embodiment, an example to test the contact resistance of the contact holes to connect the film formation layers in the pixel region has been described. The exemplary embodiment is an example where, in the case of testing sheet resistance of wiring layers, the wiring layer is provided at a relatively lower layer, connected to lead wiring of a upper layer through contact holes (relay contact holes), and in turn, the lead wiring is connected to the wiring layer through relay contact holes. Even in the exemplary embodiment, since the contact holes are used, the location of the test element pattern and the locations of the lead wiring are equalized to the vertical locations of the corresponding wiring layers in the pixel region, similar to the second exemplary embodiment.

FIG. 14 illustrates a cross-sectional structure of the test element formation region. As shown in FIG. 14, below a test element pattern T22 where the sheet resistance is to be measured, a dummy pattern D21 is formed. Below the wiring layer in the pixel region, which is the object of test, film formation layers having predetermined film formation patterns are formed with the same process as the process of forming the dummy pattern D21. Specifically, by disposing the dummy pattern D21 below the test element pattern T22, contact resistance of a contact hole C26 connecting the test element pattern T22 to the upper layer patterns can be equalized to the contact resistance of a contact hole in the pixel region.

Both ends of the test element pattern T22 are connected to lead wires 131, 132 of the upper layer through a pair of contact holes C25. In order to equalize the vertical locations of the lead wires 131, 132 to the corresponding wiring layers in the pixel region, in the exemplary embodiment, dummy patterns D23, D24 are formed between the test element pattern T22 and the lead wires 131, 132. In addition, the dummy patterns D23, D24 and the lead wires 131, 132 are formed with the film formation process of the film formation layer of, for example, the third to fifth layers in the pixel region.

In addition, the lead wires 131, 132 are connected to the wiring layers constituting pads 133, 134 through the pair of contact holes C26, respectively. Since the vertical locations of the lead wires 131, 132 are equalized to the corresponding wiring layers in the pixel region, the depth of the contact hole C26 can be equalized to that of the corresponding contact hole in the pixel region.

In this way, since the dummy pattern D21 is formed below the test element pattern T22 in the exemplary embodiment, the depth of the test element pattern T22 from the surface of the device is equalized to that of the corresponding wiring layer in the pixel region. In addition, since the lead wires 131, 132 is formed on the test element pattern T22 through the dummy patterns D23, D24, the depths of the lead wires 131, 132 from the surface of the device can be equalized to those of the corresponding wiring layers in the pixel region. As a result, since the contact resistances of the contact holes C25, C26 can be equalized to the contact resistances of the corresponding contact holes in the pixel region, it is possible to correctly test the sheet resistance of the test element pattern T22.

Moreover, even in the exemplary embodiment, the pads 133, 134 maybe formed to have the same depth from the surface of the device, and similar to the first exemplary embodiment, openings to expose the pads 133, 134 can be formed by an etching process.

In addition, even in the exemplary embodiment, it is necessary only that the depth of the contact hole in the pixel region be equalized to the depth of the relay contact hole in the test element formation region, and it is not necessary to form the dummy patterns on the same film formation layer as the film formation layer formed below the corresponding wiring layers in the pixel region. Moreover, it is also necessary only that the sum of the thicknesses of the dummy patterns be approximately equal to the sum of the thicknesses of the film formation layers formed below the corresponding wiring layers in the pixel region.

In addition, although in the aforementioned exemplary embodiments, the electrical characteristics of the dummy patterns are not specifically described, the dummy patterns may be, for example, at a floating potential, or at any potential by connection wires, for example, at the same potential as that of a PAD by connecting to a contact holes.

In addition, although the aforementioned exemplary embodiments explain the examples that the vertical locations of PAD, the test element patterns and the lead wiring, etc., are defined by forming the dummy patterns at the lower sides thereof, in the test element formation region, the same functions and effects can be obtained by cutting and lowering the other portions. For example, the surface of the substrate may be cut, and the interlayer insulating films may be cut. If it is adapted to FIG. 1, although the depths of the pads 111, 112 are equalized to each other by forming the dummy pattern D2, D4 in FIG. 1, the substrate or the interlayer insulating films of portions other than the pads 111, 112 may be cut and lowered without the formation of the dummy pattern. As a result, the depths of the pads 111, 112 can be finally controlled, so that the pads 111, 112 can be formed to have relatively shallow depths and the same depth.

Although the exemplary embodiments to obtain the same height or approximately the same height of the pads for particularly equalize the exposure of the interlayer films on particular pads are mainly described, the essential functions and effects of an aspect of the present invention are as follows.

Specifically, even after planarizing the interlayer films by a CMP process, lengths of a plurality of contact holes, which are formed on the interlayer films and connected to pads, can be the same or approximately the same. In order to obtain this function, the important requirement of the construction is that, in the patterns below the interlayer films where the contact holes are formed, the heights from arbitrary reference planes of the surface of the TFT substrate are the same over the entire region of the TFT substrate. In order to obtain this function, the aforementioned exemplary embodiments mainly describe examples where the heights are equalized by forming dummy patterns below the sub-interlayer-film wiring patterns in the test element formation region, whereby the vertical locations of the sub-interlayer-film wiring patterns are equalized among the pads. Herein, if the dummy patterns are formed to be the same as the film formation layers in the pixel region, in both of the test element formation region and the pixel region, the vertical locations of the sub-interlayer-film wiring patterns can be equalized, so that all the contact holes in both the test element formation region and the pixel region can be opened by an etching process.

In addition, another method in which the heights are equalized may occur by cutting the surface of the substrate in the pixel region or the surfaces of the interlayer films below the sub-interlayer-film wiring patterns in the pixel region, whereby the heights of the sub-interlayer-film wiring patterns in the pixel region can be equalized to the heights of the sub-interlayer-film wiring patterns in the test element formation region. Herein, the commonly essential requirement of the constructions to obtain the aforementioned functions of an aspect of the present invention is that, in the lower wiring patterns below the interlayer films where the contact holes are formed, the distances in the normal direction from the arbitrary reference plane of the surface of the TFT substrate are formed to be the same over the entire regions on the surface of the TFT substrate. As a result, even after planarizing the interlayer films by a CMP process, the lengths of the plurality of contact holes which are formed on the interlayer films over the entire regions on the surface of the TFT substrate can be the same or approximately the same, and all the contact holes can be equally opened by an interlayer film removing process. Therefore, the principal requirement of the constructions is that, in the contact holes over the entire regions on the surface of the TFT substrate, the sum of the thicknesses of the laminated films below the wring patterns which are below the interlayer films where the contact holes are formed is equalized among the plurality of contact holes. In addition, as generally analyzed, the requirement is that the sum of thicknesses of the laminated films below the wiring patterns which are below the interlayer films, where the contact holes are formed, minus the indentation depth in the normal direction from reference planes of the TFT substrate surface are equalized. Herein, the indentation depth in the normal direction of the TFT substrate surface refers to the depth of a groove in a region trenched by an etching process from a reference plane which is an original surface of the substrate and also the highest plane.

In an aspect of the present invention, while attention is paid to the test element formation region of which the base state is particularly different from that of the pixel region and which are deviated from the aforementioned requirement of the basic constructions, an approach is taken to equalize the heights by arranging below the contact holes to connect the dummy patterns to the pads in the test element formation region, the dummy pattern being the same film formation layers as those of the pixel region, and thus, the lengths of the contact holes are equalized or approximately equalized over the entire regions on the surface of the substrate, so that the contact holes can be equally formed over the entire regions on the surface of the substrate by an etching process.

In addition, although the aforementioned exemplary embodiments describe examples of a substrate for a liquid crystal device, it is apparent that the present invention can be adapted to the semiconductor substrate having the test element, such as a substrate for an electroluminescent device, an electrophoresis device.

Electronic Apparatus

Next, for an exemplary embodiment of a projection type color display device as an example of the electronic apparatus in which the electro-optical device described above in detail is used as a light valve, the whole construction, and particularly the optical construction will be described. Herein, FIG. 15 is a schematic cross-sectional view of the projection type color display device.

Figure 15:
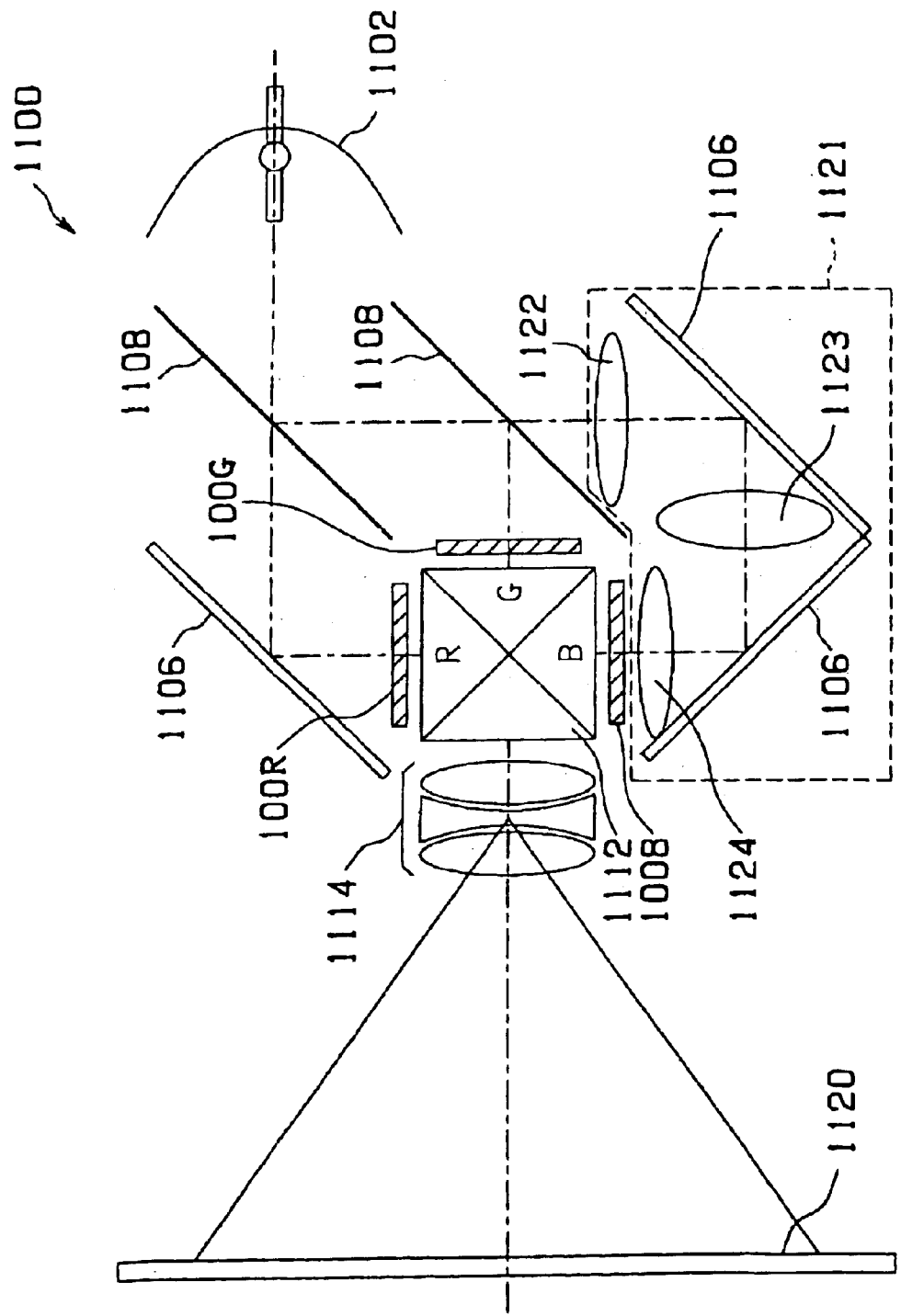
FIG. 15 is a schematic cross-sectional view of a projection-type color display apparatus.

In FIG. 15, the liquid crystal projector 1100 as an example of the projection type color display device according to the exemplary embodiment is provided with three liquid crystal modules which include the liquid crystal devices in which driving circuits are mounted on the TFT array substrate, and is constructed as a projector which use as RGB light valves 100R, 100G, and 100B, respectively. In the liquid crystal projector 1100, when the projection light is emitted from a lamp unit 1102 of a white light source, such as a metal halide lamp, etc., the light is divided into light components R, G, and B corresponding to the three primary colors of RGB by three pieces of mirrors 1106 and two pieces of dichroic mirrors 1108, and then guided to the light values 100R, 100G, and 100B corresponding to each color. At this time, in particular, the B light is guided through relay lens system 1121 which includes an incident lens 1122, a relay lens 1123, and an emitting lens 1124 in order to reduce or prevent light loss due to long light paths. In addition, the light components corresponding to the three primary colors, which are modulated by the light valves 100R, 100G, and 100B, respectively, are combined again by a dichroic prism 1112, and then projected as a color image to a screen 1120 through the projection lens 1114.

The present invention is not limited to the aforementioned exemplary embodiments, and can be suitably modified without departing from the principle or sprit of the invention and any electro-optical device, a method of manufacturing the same and an electronic apparatus involved in the modifications are also included into the technical scope of the present invention. The electro-optical device can be adapted to an electrophoresis device, an EL (electroluminescent) device, or the like.

What is claimed is:

1. A substrate for an electro-optical device, comprising:
   a plurality of sub-interlayer-film wiring patterns formed in film formation layers which are disposed above a test-element-provided substrate;
   interlayer film formed on the plurality of sub-interlayer-film wiring patterns, the surfaces of the interlayer films being planarized;
   a plurality of contact holes formed in the planarized interlayer film corresponding to some of the plurality of sub-interlayer-film wiring patterns; and
   laminated films provided between the substrate and the plurality of sub-interlayer-film wiring patterns, the thicknesses of regions of the laminated films corresponding to the plurality of contact holes being equal or substantially equal.

2. A substrate for an electro-optical device, comprising:
   a test-element-provided substrate having a plurality of indentation portions formed on the surface of the substrate and other portions,
   a plurality of sub-interlayer-film wiring patterns formed in film formation layers disposed in at least one of the indented portions and the other portions;
   interlayer films formed on the plurality of sub-interlayer-film wiring patterns, the surface of the interlayer films being planarized;
   a plurality of contact holes formed in the planarized interlayer films corresponding to some of the plurality of sub-interlayer-film wiring patterns; and
   laminated films provided between the substrate and the plurality of sub-interlayer-film wiring patterns, the thicknesses of regions of the laminated films corresponding to the plurality of contact holes minus the indentation depth in the normal direction of the surface of the substrate being equal or substantially equal.

3. A test-element-provided substrate, comprising:
   a plurality of film formation layers on which respective film formation patterns are formed;
   interlayer films interlayered betweeen corresponding ones of the plurality of film formation layers;
   test element patterns formed in test element formation regions with the same material as that of each film formation pattern of at least one film formation layer among the plurality of film formation layers;
   openings formed in the test element formation regions of a planarized uppermost layer of the interlayer films, the openings exposing a plurality of pads connected to the test element patterns; and
   dummy patterns formed below the corresponding of the plurality of pads, the dummy patterns being formed with the same material as that of each of the film formation patterns of predetermined film formation layers among the plurality of film formation layers.

4. The test-element-provided substrate according to claim 3,
   the dummy patterns being provided to independently control the distances from the surfaces of the planarized interlayer films to the plurality of pads, thereby exposing all the plurality of pads which need to be exposed by an interlayer film removing process at the time of forming the openings, from the surfaces of the planarized interlayer films to the plurality of pads.

5. The test-element-provided substrate according to claim 3,
   the dummy patterns being independently formed below the plurality of pads, whereby the distances from the surfaces of the planarized interlayer films to the plurality of pads are equalized.

6. The test-element-provided substrate according to claim 3,
   the dummy patterns being formed below the plurality of pads as film formation patterns of the same film formation layers.

7. The test-element-provided substrate according to claim 6,
   the dummy patterns being formed below the plurality of pads as two separated patterns.

8. The test-element-provided substrate according to claim 3,
   the openings being opened by etching the planarized interlayer films, and
   the dummy patterns having respective margins corresponding to allowable over-etching amounts for the plurality of pads, thereby independently controlling the distances from the surfaces of planarized interlayer films to the plurality of pads.

9. A test-element-provided substrate, comprising:
   a plurality of film formation layers on which respective film formation patterns are formed;
   interlayer films interlayered between corresponding ones of the plurality of film formation layers;
   first contact holes formed in a planarized interlayer film on a predetermined wiring layer among the plurality of film formation layers, the first contact holes being electrically connected to the wiring layers;
   a wiring pattern formed in a test element formation region, the wiring pattern being formed with same material as the predetermined wiring layer of the film formation patterns of during a film formation process of the predetermined wiring layers;
   second contact holes formed in the planarized interlayer films on the wiring patterns, the second contact holes being electrically connected to the wiring patterns;
   openings formed in the test element formation regions of a planarized uppermost layer of the interlayer films, the openings exposing pads connected to the wiring patterns through the second contact holes; and dummy patterns formed below the wiring patterns.

10. The test-element-provided substrate according to claim 9, the dummy patterns being formed below the wiring patterns, whereby the distances from the surfaces of the planarized interlayer films to the wiring layers and the distances from the surfaces of the planarized interlayer films to the wiring patterns are equalized.

11. The test-element-provided substrate according to claim 10, the dummy patterns being formed below the wiring patterns with the same materials as those of the film formation patterns of the film formation layers which are formed below the predetermined wiring layers.

12. The test-element-provided substrate according to claim 11, the dummy patterns extending from at least some of the film formation patterns of the film formation layers.

13. A method of manufacturing a test-element-provided substrate, comprising:

forming a plurality of dummy patterns for controlling the heights of surfaces of pads in a plurality of a pad formation region in a test element formation region with a same material as film formation patterns of a predetermined film formation layer among a plurality of film formation layers to be laminated, forming interlayer films on the predetermined film formation layer;

forming test element patterns in the test element formation region at the same time as forming the film formation patterns; and forming openings in the test element formation region of a planarized uppermost layer of the interlayer films to expose a plurality of pads connected to the test element patterns.

14. A method of manufacturing a test-element-provided substrate, comprising:

forming a plurality of dummy patterns for controlling the heights of bottoms of contact holes in a plurality of contact hole formation regions in test element formation regions with a same material as film formation patterns of predetermined film formation layers among a plurality of film formation layers to be laminated;

forming predetermined wiring layers among the plurality of film formation layers, and wiring patterns in test element formation regions with the same material in a same film formation;

forming first contact holes through planarized interlayer films on the wiring layers, thereby making conduction to the wiring layers possible, and forming second contact holes in the planarized interlayer films on the wiring patterns, thereby making conduction to the wiring patterns possible; and forming openings in the test element formation regions a planarized uppermost layer of the interlayer films, thereby exposing pads connected to the second contact holes.

15. A substrate for an electro-optical device, comprising:

a pixel electrode layer where film formation patterns of pixel electrodes are provided corresponding to intersections of a plurality of data lines and a plurality of scan lines which are disposed in a matrix shape in a plane;

a first film formation layer where film formation patterns of the plurality of data lines are formed;

a second film formation layer where film formation patterns of the plurality of scan lines and film formation patterns of switching elements for supplying signals to the pixel electrodes are formed;

interlayer films interlayered between the pixel electrode layer, the first film formation layer, and the second film formation layer;

test element patterns formed in test element formation regions with the same material as that of each of the film formation patterns of at least one of the pixel electrode layer, the first film formation layer, and the second film formation layer, or other film formation layers;

openings formed in the test element formation regions of a planarized uppermost layer of an interlayer film, the openings exposing a plurality of pads connected to the test element patterns; and dummy patterns formed below a corresponding ones of the plurality of pads with the same material as the film formation patterns of predetermined film formation layer among the plurality of film formation layers.

16. The substrate for an electro-optical device according to claim 15, the dummy patterns extending from at least some of the film formation patterns of the predetermined film formation layers among the plurality of film formation layers.

17. A substrate for an electro-optical device, comprising:

a pixel electrode layer where film formation patterns of pixel electrodes are formed corresponding to the intersections of a plurality of data lines and a plurality of scan lines which are disposed in a matrix shape in a plane;

a first film formation layer where film formation patterns of the plurality of data lines are formed;

a second film formation layer where film formation patterns of the plurality of scan lines and film formation patterns of switching elements for supplying signals to the pixel electrodes are formed;

interlayer films interlayered between the pixel electrode layer, the first film formation layer, and the second film formation layer;

first contact holes formed through a planarized interlayer film on predetermined wiring layer of at least one of the pixel electrode layer, the first film formation layer, and the second film formation layerand another, film formation layers thereby being connected to the wiring layers;

wiring patterns formed on test element formation regions with the same material as the film formation patterns of the wiring layers second contact holes formed in the planarized interlayer films, the second contact holes being electrically connected to the wiring patterns;

openings formed in the test element formation regions of an interlayer film of a planarized uppermost layer, the openings exposing pads that are connected to the wiring patterns through the second contact holes; and dummy patterns formed below the wiring patterns. patterns, thereby being electrically connected to the wiring patterns;

openings formed in the test element formation regions of an interlayer film of a planarized uppermost layer, thereby exposing pads connected to the wiring patterns through the second contact holes; and dummy patterns formed below the wiring patterns.

18. An electro-optical device constructed by using the substrate for an electro-optical device according to claim 16.

19. An electro-optical device constructed by using the substrate for an electro-optical device according to claim 17.

20. An electronic apparatus constructed by using an electro-optical device constructed by using the substrate for an electro-optical device according to claim 16.

21. An electronic apparatus constructed by using an electro-optical device constructed by using the substrate for an electro-optical device according to claim 17.

* * * * *